US008516609B2

(12) United States Patent  
Woodward et al.

(10) Patent No.: US 8,516,609 B2
(45) Date of Patent: Aug. 20, 2013

(54) PERSONAL ENCRYPTION DEVICE

(75) Inventors: Richard John Woodward, Warrington (GB); Amanda Jane Adams, Flint (GB)

(73) Assignee: Bank of America Corporation, Charlotte, NC (US)

( * ) Notice: Subject to any disclaimer, the term of this patent is extended or adjusted under 35 U.S.C. 154(b) by 222 days.

(21) Appl. No.: 13/025,507

(22) Filed: Feb. 11, 2011

(65) Prior Publication Data

US 2012/0210122 A1 Aug. 16, 2012

(51) Int. Cl.
*G06F 12/14* (2006.01)
*G06F 11/30* (2006.01)
*G06F 7/04* (2006.01)

(52) U.S. Cl.
USPC ............. 726/33; 713/151; 713/150; 713/192; 705/55

(58) Field of Classification Search
USPC ............. 713/150, 151, 192; 726/33; 705/55
See application file for complete search history.

(56) References Cited

U.S. PATENT DOCUMENTS

| | | | | |
|---|---|---|---|---|
| 5,623,637 A * | 4/1997 | Jones et al. | ................... | 711/164 |
| 6,003,135 A * | 12/1999 | Bialick et al. | ................... | 726/29 |
| 6,088,802 A * | 7/2000 | Bialick et al. | ................... | 726/3 |
| 7,043,643 B1 * | 5/2006 | Doe et al. | ................... | 713/189 |
| 7,441,108 B2 * | 10/2008 | Fisher et al. | ................... | 712/227 |
| 7,945,955 B2 * | 5/2011 | Katkar | ................... | 726/22 |
| 8,117,438 B1 * | 2/2012 | Albisu et al. | ................... | 713/156 |
| 2003/0095659 A1 * | 5/2003 | Ishihara et al. | ................... | 380/46 |
| 2003/0131244 A1 * | 7/2003 | Buoncristiani et al. | ........ | 713/176 |
| 2004/0083378 A1 * | 4/2004 | LeRose | ................... | 713/193 |
| 2004/0215964 A1 * | 10/2004 | Barlow et al. | ................... | 713/172 |
| 2005/0268116 A1 | 12/2005 | Jeffries | | |
| 2007/0245108 A1 * | 10/2007 | Yasaki et al. | ................... | 711/163 |
| 2008/0130895 A1 * | 6/2008 | Jueneman et al. | ........... | 380/277 |
| 2008/0263363 A1 * | 10/2008 | Jueneman et al. | ........... | 713/184 |
| 2009/0183254 A1 * | 7/2009 | Franco et al. | ................... | 726/17 |
| 2010/0223403 A1 * | 9/2010 | Chau et al. | ................... | 710/14 |
| 2010/0228995 A1 | 9/2010 | Jacobus et al. | | |
| 2011/0022948 A1 * | 1/2011 | Brown et al. | ................... | 715/236 |
| 2011/0113235 A1 * | 5/2011 | Erickson | ................... | 713/152 |

FOREIGN PATENT DOCUMENTS

WO 2008147577 A2 12/2008

OTHER PUBLICATIONS

Hiltgen, Alain et al. "Secure Internet Banking Authentication", IEEE, 2006.*

* cited by examiner

*Primary Examiner* — Michael Simitoski
(74) *Attorney, Agent, or Firm* — Banner & Witcoff, Ltd.; Michael A. Springs

(57) ABSTRACT

A method and system for securing a handheld computing device is described. A personal encryption device may be physically connected to a handheld computing device. Responsive to the connection, a main screen user interface may be displayed on a display of the handheld computing device. The main screen user interface may include at least one cryptography option for a user of the handheld computing device. A user-defined input representative of selection of a first cryptography option of the at least one cryptography option may be received, and at least one cryptography process associated with the selected first cryptography option may be implemented by the handheld computing device and personal encryption device. The cryptography options may include encryption, decryption, digital signatures, and digital signature verification.

17 Claims, 22 Drawing Sheets

PERSONAL ENCRYPTION DEVICE

BACKGROUND

Data security and integrity is a constant need of any entity. In addition, mobility is indeed often sought after for ease of use by employees of an entity. Today, use of handheld computing devices for work purposes has become an everyday occurrence. Yet, security of the data received by, maintained on, and/or transmitted from such handheld computing devices may not always be adequate. Securing documents, folders, and/or directories on handheld computing devices using hardened security may not always be an option. Private key information, utilized as part of a public-key infrastructure, may not be able to be stored securely on such handheld computing devices. A need exists for heightened security of data associated with handheld computing devices.

SUMMARY

In light of the foregoing background, the following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. The following summary merely presents some concepts of the present disclosure in a simplified form as a prelude to the more detailed description provided below.

Aspects of the present disclosure are directed to a method and system for securing a handheld computing device. A personal encryption device may be physically connected to a handheld computing device. Responsive to the connection, a main screen user interface may be displayed on a display of the handheld computing device. The main screen user interface may include at least one cryptography option for a user of the handheld computing device. A user-defined input representative of selection of a first cryptography option of the at least one cryptography option may be received, and at least one cryptography process associated with the selected first cryptography option may be implemented by the handheld computing device and personal encryption device. The cryptography options may include encryption, decryption, digital signatures, and digital signature verification.

In accordance with another aspect of the present disclosure, the data for operating the handheld computing device with the personal encryption device may include a PK certificate of the personal encryption device. The PK certificate may be maintained on the handheld computing device. A determination may be made as to whether the personal encryption device has been disconnected from the handheld computing device. Responsive to determining the personal encryption device has been disconnected from the handheld computing device, at least one document, folder, and/or directory may be encrypted with the PK certificate of the personal encryption device maintained on the handheld computing device.

Aspects of the present disclosure may be provided in a non-transitory computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Although not required, various aspects described herein may be embodied as a method, a data processing system, or as a non-transitory computer-readable medium storing computer-executable instructions. For example, one or more computer-readable media storing instructions to cause one or more processor to perform steps of a method in accordance with aspects of the present disclosure is contemplated. For example, aspects of the method steps disclosed herein may be executed on one or more processors on a computing device 101. Such processors may execute computer-executable instructions stored on computer-readable media. The disclosure may also be practiced in distributed computing environments where tasks are performed by remote processing devices that are linked through a communications network. In a distributed computing environment, program modules may be located in both local and remote computer storage media including memory storage devices.

Figure 1:
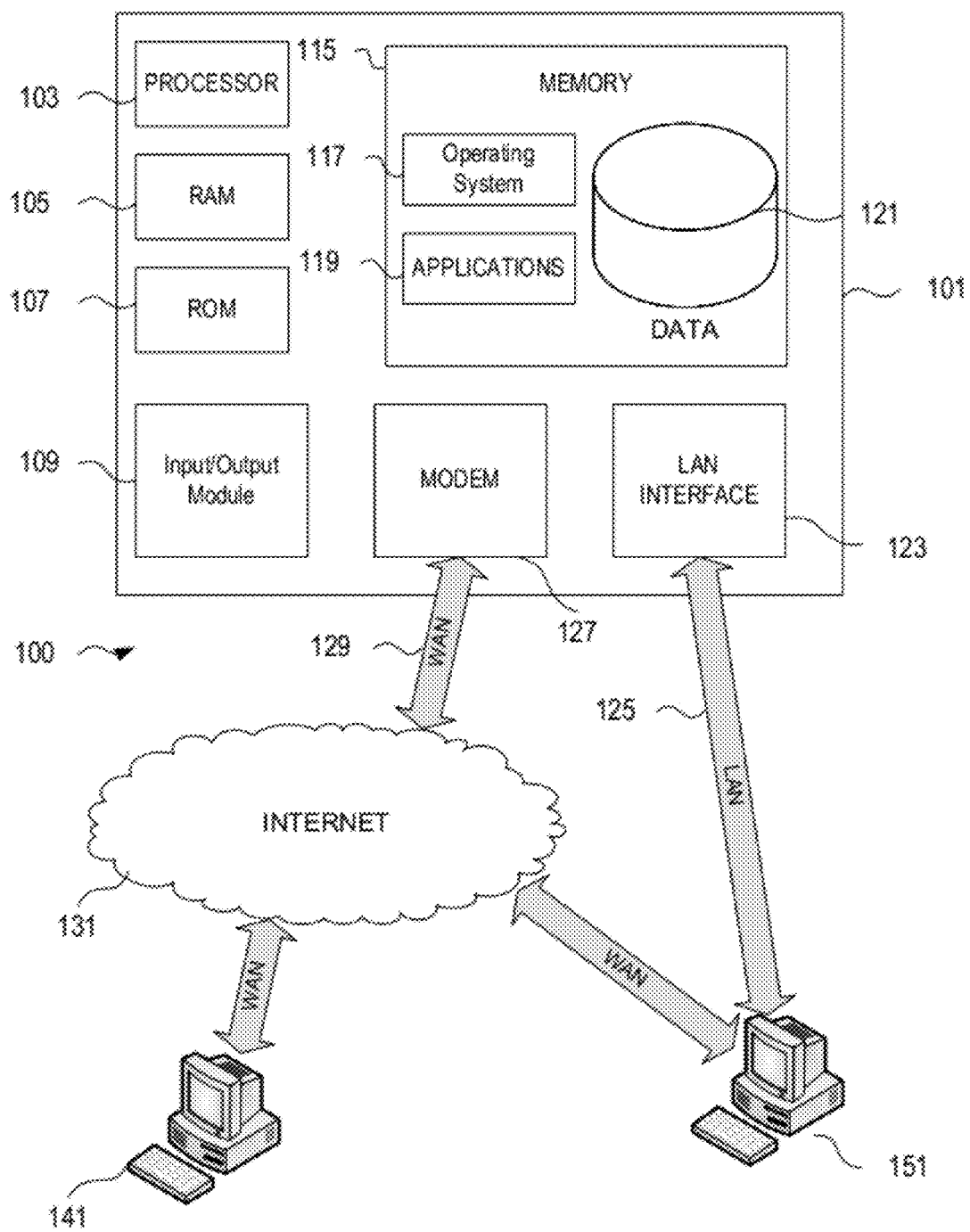
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computing device 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of computing device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The computing device 101 may operate in a networked environment supporting connections to one or more remote computers, such as terminals 141 and 151. The terminals 141 and 151 may be personal computers or servers that include many or all of the elements described above relative to the computing device 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
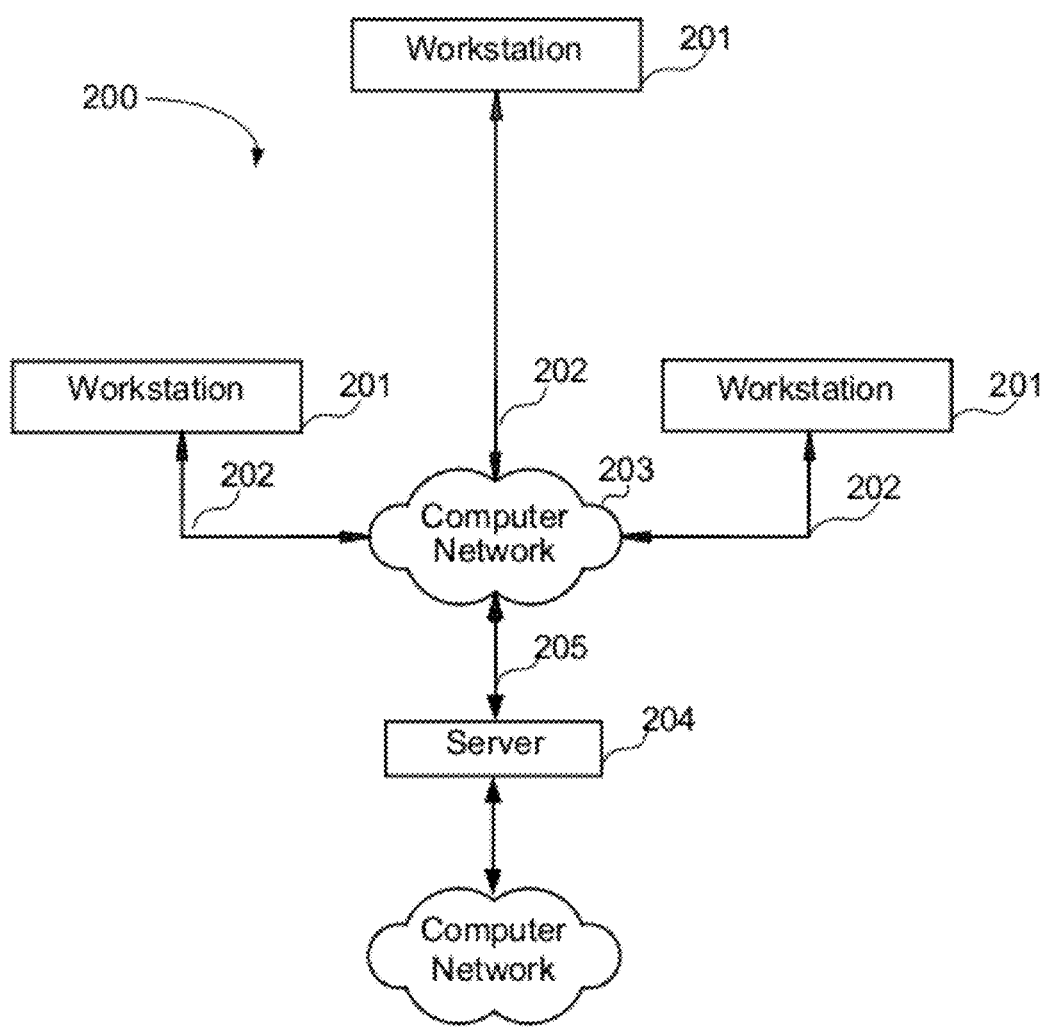
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

Figure 3:
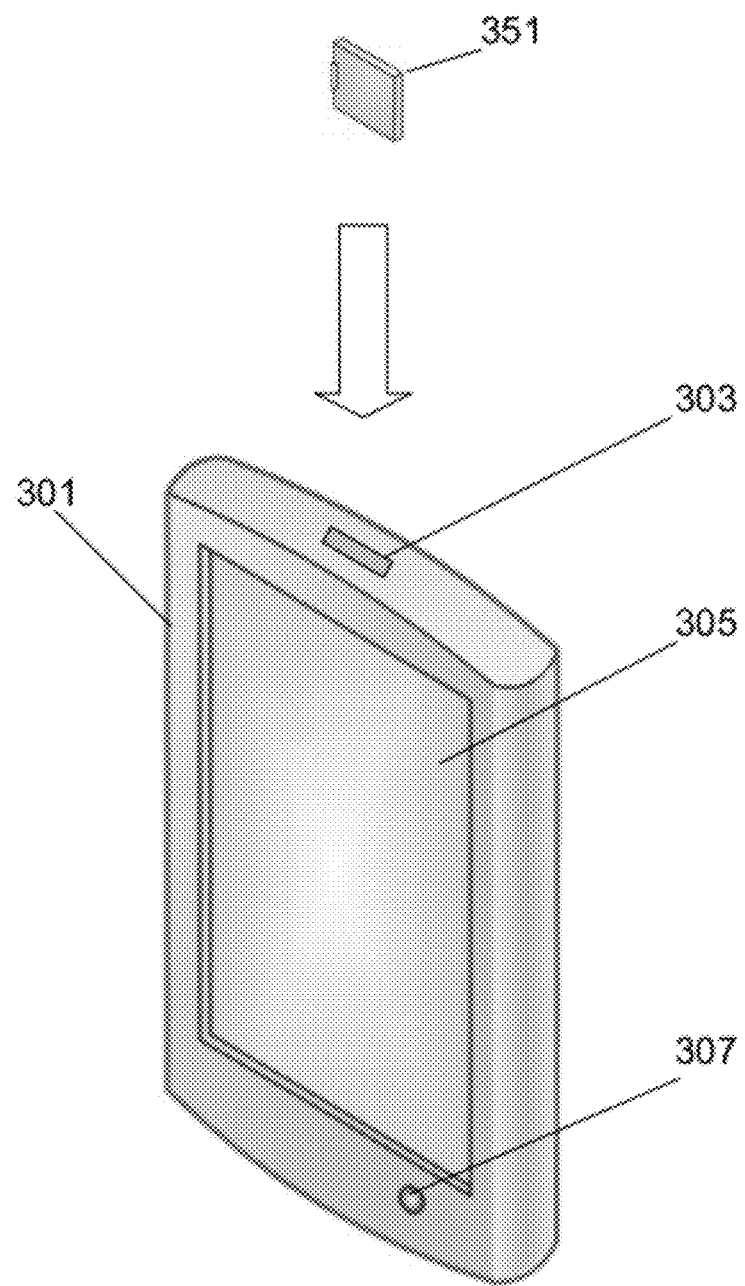
FIG. 3 shows a block diagram of an illustrative connection of a personal encryption device to a handheld computing device in accordance with at least one aspect of the present disclosure.

FIG. 3 shows a block diagram of an illustrative connection of a personal encryption device to a handheld computing device in accordance with at least one aspect of the present disclosure. As shown, handheld computing device 301 may be a small computing device configured to be the size of a tablet PC. Handheld computing device 301 may be any of a number of small computing devices. Handheld computing device 301 may be configured to read flash memory such as USB flash memory; however, handheld computing device 301 may not be able to physically connect via a USB access port. Handheld computing device 301 may not be configured to secure directories, folders, documents, or e-mails using any type of hardened security. In addition handheld computing device 301 may be unable to store private key information associated with a public key infrastructure securely.

As further shown, a personal encryption device 351 may be configured to provide public-key infrastructure technology including digital signatures. Personal encryption device 351 may be certified in accordance with the Federal Information Processing Standard (FIPS) publication 140-2. Still further, personal encryption device 351 may be configured to store private key information up to 2048. Personal encryption device 351 may be configured to provide hash functionality including SHA-1, a cryptographic hash function designed by the national security agency and published as a U.S. FIPS.

In one illustrative configuration, handheld computing device 301 may be configured to store and run drivers to operate FIPS certified USB tokens using a standard PKCS#11 application programming interface (API). In another illustrative configuration, personal encryption device 351 may be configured to have SHA-256 minimum. One more components of handheld computing device 301 and/or personal encryption device 351 may be one or more components found in FIGS. 1 and/or 2. For example, handheld computing device 301 may include a processor 101, random access memory 105, read-only memory 107, an input/output module 109, and a memory 115 with operating system 117, applications 119, and database 121. Similarly, personal encryption device 351 may include one or more of these and/or other components of FIGS. 1 and 2.

One more aspects of the present disclosure are directed to enabling a handheld computing device, such as handheld computing device 301, to have authentication, to have the ability for digital signatures, to have the ability for hardened encryption and decryption of folders, directories, documents, and e-mail, in addition to SSL connections or VPN connections. Personal encryption device 351 may be configured to connect to an input/output port 303 of handheld computing device 301. Input/output port 303 may be located anywhere on handheld computing device and the illustrative example at the top of handheld computing device 301 and FIG. 3 is but one example. As shown, handheld computing device 301 further includes a display 305 and an access button 307. Display 305 may be configured to allow for a user to input data through touch screen technology. Alternatively and/or concurrently, display 305 may allow for a user to use a stylus for input of user data, an external keyboard for input of user data, and/or other external devices.

Without the attachment of a personal encryption device 351, handheld computing device 301 may not include any cryptography technology to secure data received by the handheld computing device 301, data transmitted from the handheld computing device 301, and/or data maintained within the handheld computing device 301. In accordance with one or more aspects of the present disclosure, upon connection of a personal encryption device 351, handheld computing device 301 may be configured to secure data received by the handheld computing device 301, secure data transmitted from the handheld computing device 301, and/or secure data maintained within the handheld computing device 301.

Some aspects of the present disclosure are directed to a user interface of menu options that may be provided to a handheld computing device to allow the user to utilize cryptography technology on the handheld computing device. Upon connection of a personal encryption device, data may be loaded, as described in more detail below, on the handheld computing device to provide a user interface of menu options on the display of handheld computing device for subsequent connections of the personal encryption device.

Figure 4A:
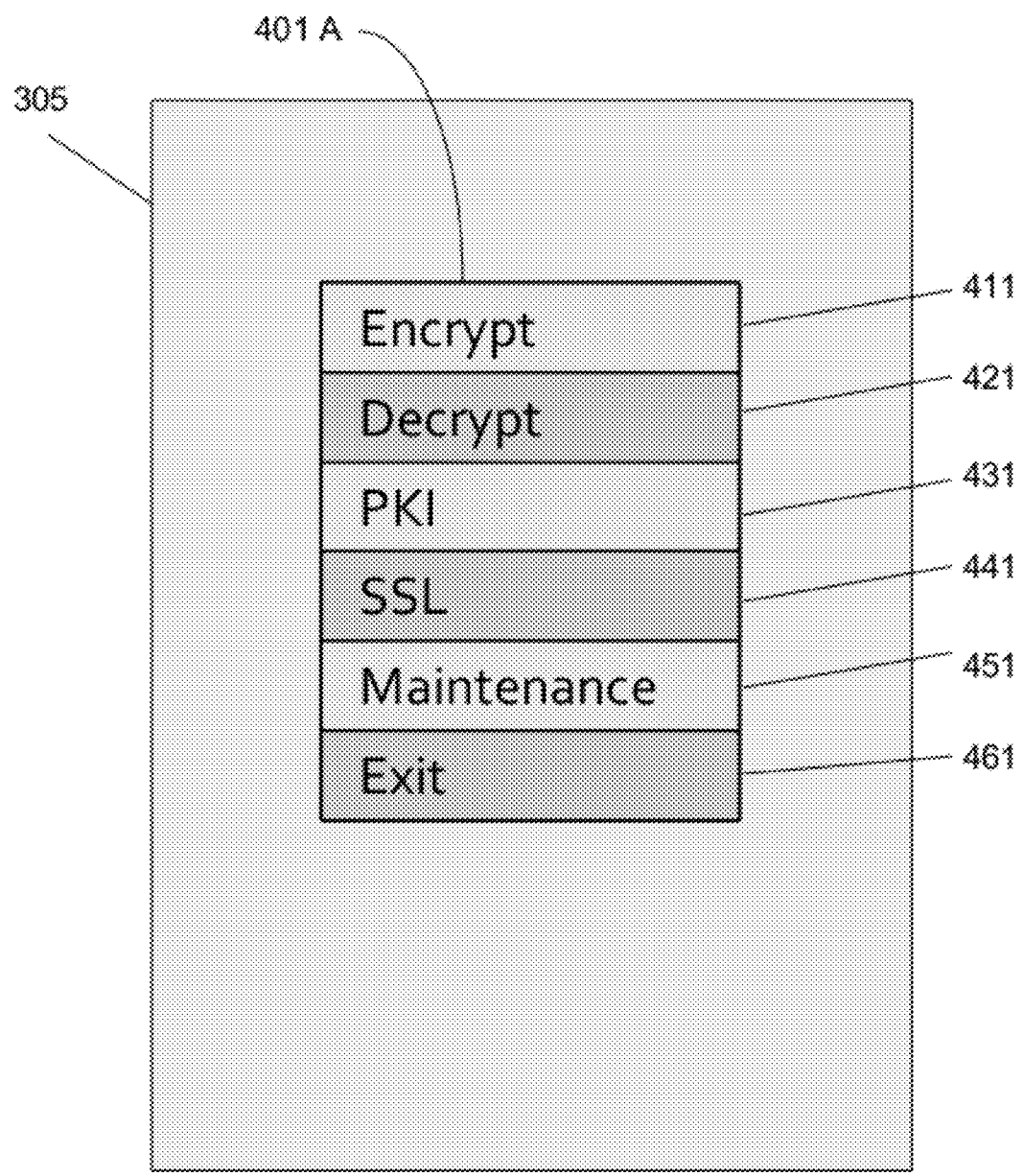
FIG. 4A shows an illustrative user interface of an options menu home screen that may be rendered on a display of a handheld computing device in accordance with at least one aspect of the present disclosure.

FIG. 4A shows an illustrative user interface 401A of an options menu home screen that may be rendered on a display 305 of a handheld computing device, such as handheld computing device 301 of FIG. 3, in accordance with at least one aspect of the present disclosure. User interface 401A may be rendered upon a display 305 of a handheld computing device as semi-transparent. For such a configuration, user interface 401A may appear to float over an underlying start up or home screen for software running on the handheld computing device. In an alternative embodiment, user interface 401A may be rendered on display 305 in place of a startup or home screen for software running on the handheld computing device. For such a configuration, user interface 401A may be the only visual element on display 305.

By accessing one or more options of user interface 401A, a user of a handheld computing device with a personal encryption device connected thereto may utilize cryptography technology through the handheld computing device. As shown in FIG. 4A, user interface 401A includes an encrypt option 411, a decrypt option 421, a PKI option 431, an SSL option 441, a maintenance option 451, and an exit option 461. When accessed, exit option 461 may be configured to remove focus from or entirely close user interface 401A of the options menu home screen. Each of the other illustrative option elements is described in more detail below. As understood, user interface 401A is but one example of an options menu home screen that may be utilized and rendered on a display. The present disclosure is not limited to the examples provided herein and the examples of FIGS. 4A-4F are but some illustrative examples.

Figure 4B:
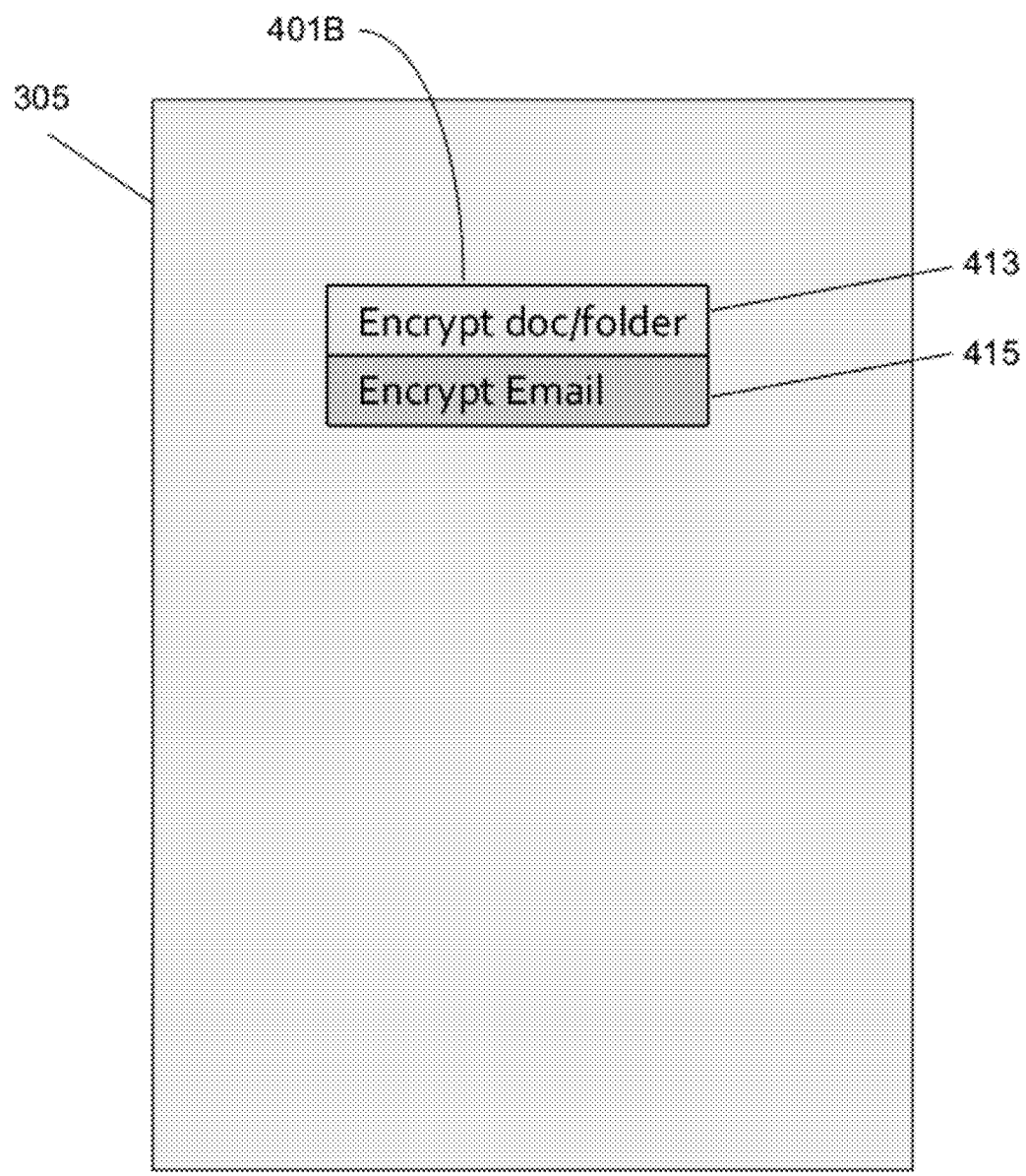
FIG. 4B shows an illustrative user interface of an encrypt options sub-menu screen that may be rendered on a display of a handheld computing device in accordance with at least one aspect of the present disclosure.

FIG. 4B shows an illustrative user interface 401B of an encrypt options sub-menu screen that may be rendered on a display 305 of a handheld computing device, such as handheld computing device 301 of FIG. 3, in accordance with at least one aspect of the present disclosure. FIG. 4B illustrates an example where a user has accessed the encrypt option 411 in FIG. 4A. User interface 401B provides a user with the manual ability to encrypt data on the handheld computing device with the personal encryption device connected thereto, such as the configuration illustrated in FIG. 3. Selection of encrypt doc/folder option 413 allows a user the manual ability to encrypt one or more documents, one or more folders, and/or one or more directories on the handheld computing device, such as handheld computing device 301 in FIG. 3.

For example, a user of a handheld computing device without cryptography technology may desire to encrypt a document maintained on the handheld computing device. Upon connection of a personal encryption device to the handheld computing device, the user may access the encrypt doc/folder option 413 and subsequently choose the document for encryption. Once encrypted with key data associated with the personal encryption device, the now encrypted document may only be decrypted for access to read, write, and/or both the document by use of the personal encryption device. As such upon removal of the personal encryption device, the encrypted document maintained on the handheld computing device may not be accessed, even by the user, without reconnection of the personal encryption device. Therefore if the handheld computing device should be lost and/or stolen, the document that has been encrypted and any other document, folder, directory that may similarly be encrypted may not be accessible by another individual that comes into possession of the handheld computing device.

Figure 11:
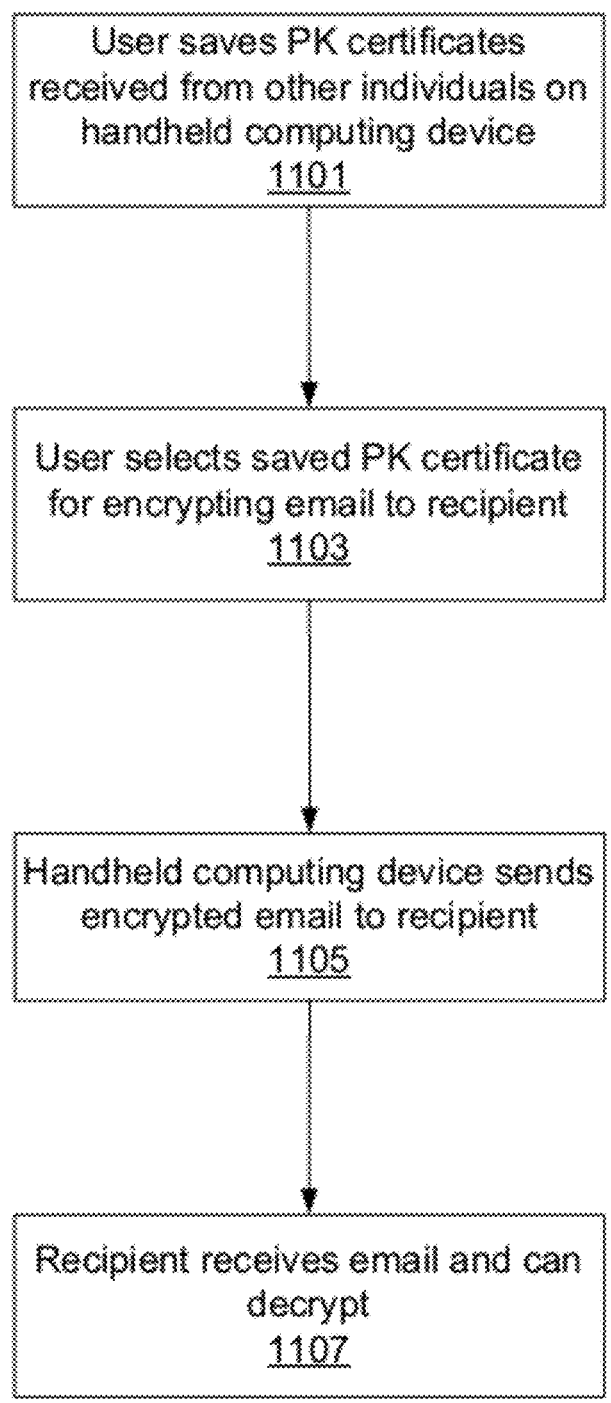
FIG. 11 is an example flow chart of an illustrative method for using PK certificates of others in accordance with at least one aspect of the present disclosure.

Also shown in FIG. 4B, user interface 401B may include an encrypt e-mail option 415. Selection of encrypt e-mail option 415 allows a user the manual ability to encrypt e-mails with another person's public key certificate. FIG. 11, as described in more detail below, is an illustrative process for encryption of e-mails with another person's public key certificate utilizing a handheld computing device with a personal encryption device connected thereto. Although not shown, selection of encrypt doc/folder option 413 and/or encrypt e-mail option 415 may have a number of additional user interfaces rendered on display 305 to allow the user to select the one or more documents, folders, directories and/or the one or more e-mails on the handheld computing device for encryption by the personal encryption device.

Figure 4C:
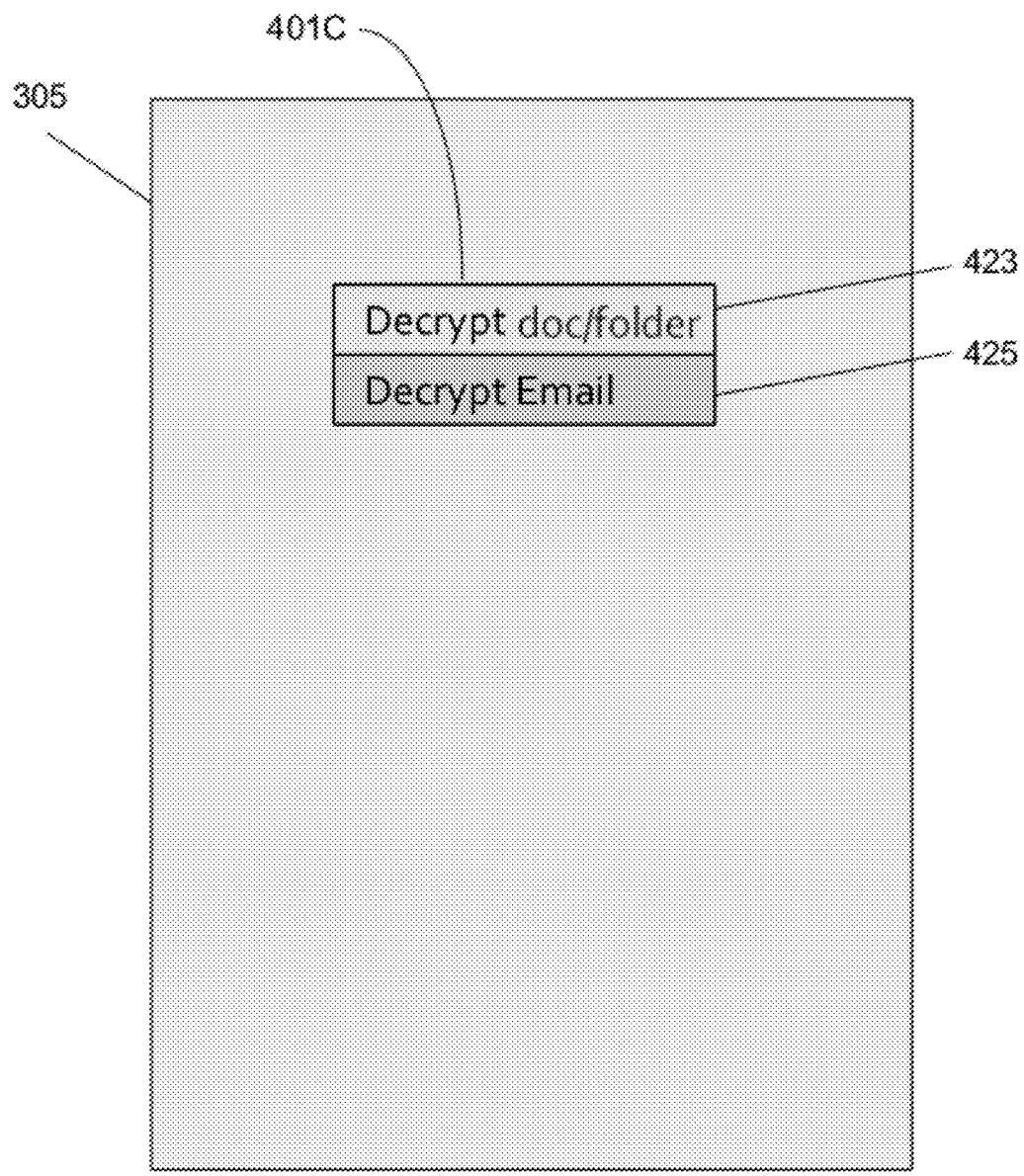
FIG. 4C shows an illustrative user interface of a decrypt options sub-menu screen that may be rendered on a display of the handheld computing device in accordance with at least one aspect of the present disclosure.

FIG. 4C shows an illustrative user interface 401C of a decrypt options sub-menu screen that may be rendered on a display 305 of the handheld computing device, such as handheld computing device 301 of FIG. 3, in accordance with at least one aspect of the present disclosure. FIG. 4C illustrates an example where a user has accessed the decrypt option 421 in FIG. 4A. User interface 401C provides a user with the manual ability to decrypt data on the handheld reading device with the personal encryption device connected thereto, such as the configuration illustrated in FIG. 3. Selection of the decrypt doc/folder option 423 allows a user the manual ability to decrypt one or more documents, one or more folders, and/or one or more directories on the handheld computing device, such as handheld computing device 301 in FIG. 3, using the private key associated with the personal encryption device. In such an example, authentication may be required.

For example, a user of the handheld computing device without cryptography technology may desire to decrypt a document maintained on the handheld computing device. Upon connection of the personal encryption device to the handheld computing device, the user may access the decrypt doc/folder option 423 and subsequently choose the document for decryption once decrypted with the key data associated with the personal encryption device, the now decrypted document may be accessed to read the document, write to the document, and/or both. Although not shown, a further sub-menu from decrypt doc/folder option 423 may allow a user to maintain a decrypted document, folder, and/or directory in a decrypted state even upon removal of the personal encryption device. In such configuration, upon removal of the personal encryption device, the decrypted document may remain decrypted and maintained on the handheld computing device. In other configurations upon removal of the personal encryption device, the once decrypted document may be encrypted, as described in more detail herein, and maintained on the handheld computing device. This encrypted document may not be accessed, even by the user, without reconnection of the personal encryption device.

Also shown in FIG. 4C, user interface 401C may include a decrypt e-mail option 425. Selection of decrypt e-mail option 425 allows a user the manual ability to decrypt e-mails using the private key associated with the personal encryption device. In such an example, authentication may be required. Although not shown, selection of decrypt doc/folder option 423 and/or decrypt e-mail option 425 may have a number of additional user interfaces rendered on display 305 to allow the user to select the one or more documents, folders, directories and/or the one or more e-mails on the handheld computing device for decryption by the personal encryption device.

Figure 4D:
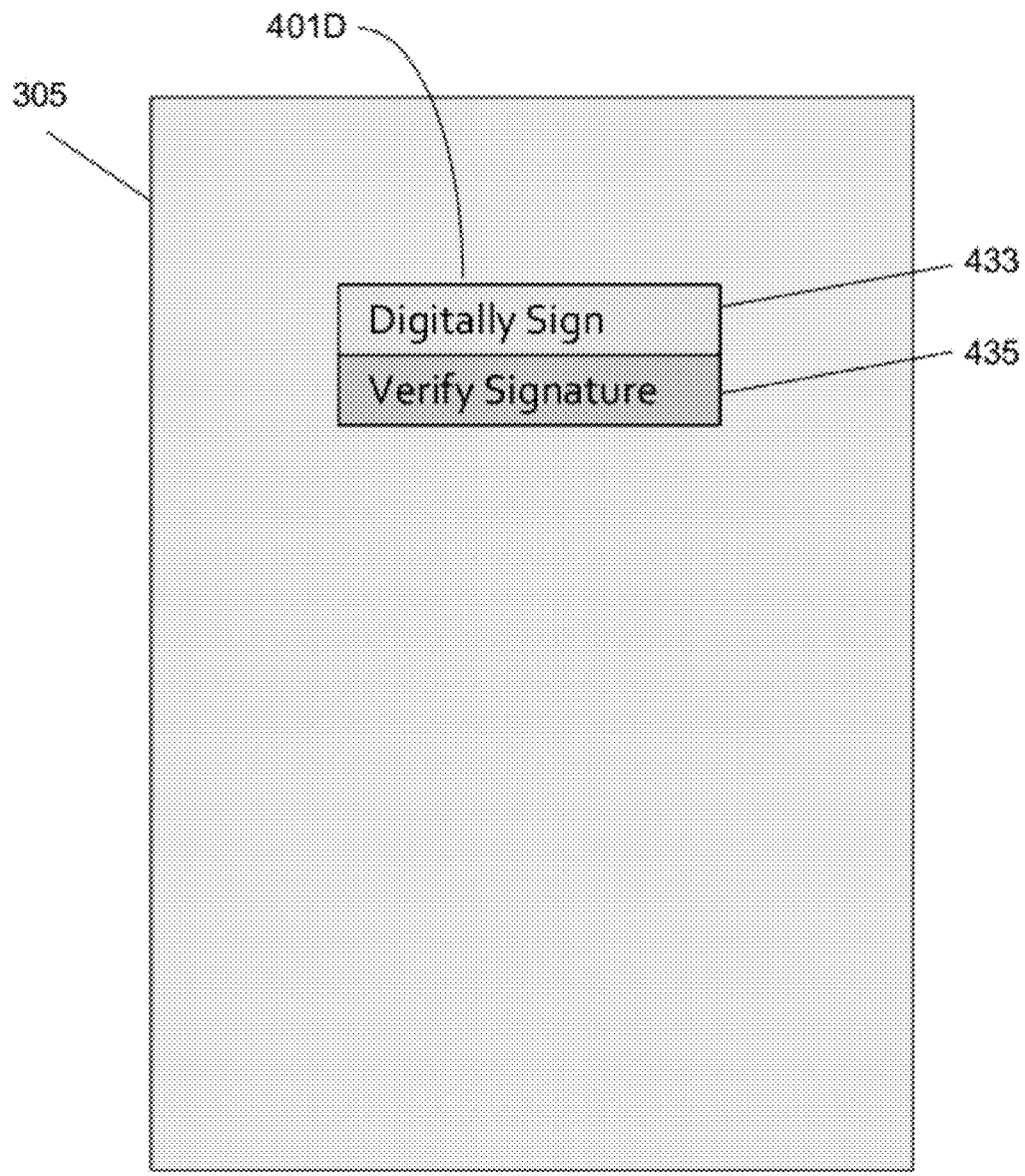
FIG. 4D shows an illustrative user interface of a digital signature options sub-menu screen that may be rendered on a display of the handheld computing device in accordance with at least one aspect of the present disclosure.

FIG. 4D shows an illustrative user interface 401D of a digital signature options sub-menu screen that may be rendered on a display 305 of the handheld computing device, such as handheld computing device 301 of FIG. 3, in accordance with at least one aspect of the present disclosure. FIG. 4D illustrates an example where a user has accessed the PKI option 431 in FIG. 4A. User interface 401D provides a user with the ability to digitally sign documents or e-mails with their private key associated with the personal encryption device or to verify a signature received from another source. Selection of the digitally sign option 433 allows a user the ability to digitally sign documents or e-mails with their private key associated with the personal encryption device that are maintained on the handheld computing device, such as handheld computing device 301 in FIG. 3. In such an example, authentication may be required.

For example, a user of the handheld computing device without cryptography technology may desire to validate/sign a document maintained on the handheld computing device. Upon connection of the personal encryption device to the handheld computing device, the user may access the digitally sign option 433 and subsequently choose the document for inclusion of a digital signature. In such an example the user may be required to authenticate to the personal encryption device using a personal encryption device personal identification number and/or password associated with the user. The secret key maintained on the personal encryption device may then be used to digitally sign the identify document. As such, as described in more detail herein, an e-mailed copy of the digitally signed document may be validated by a recipient as a true digitally signed document.

Also shown in FIG. 4D, user interface 401D may include a verify signature option 435. Selection of verify signature option 435 allows a user the ability to verify a digital signature received from another source. In such an example, the PK certificate associated with the sender may be utilized to validate the origin of the digitally signed document. Although not shown, selection of digitally sign option 433 and/or verify signature option 435 may have a number of additional user interfaces rendered on display 305 to allow the user to select the one or more documents to digitally sign and or to verify the digital signature that are maintained on the handheld computing device.

Figure 4E:
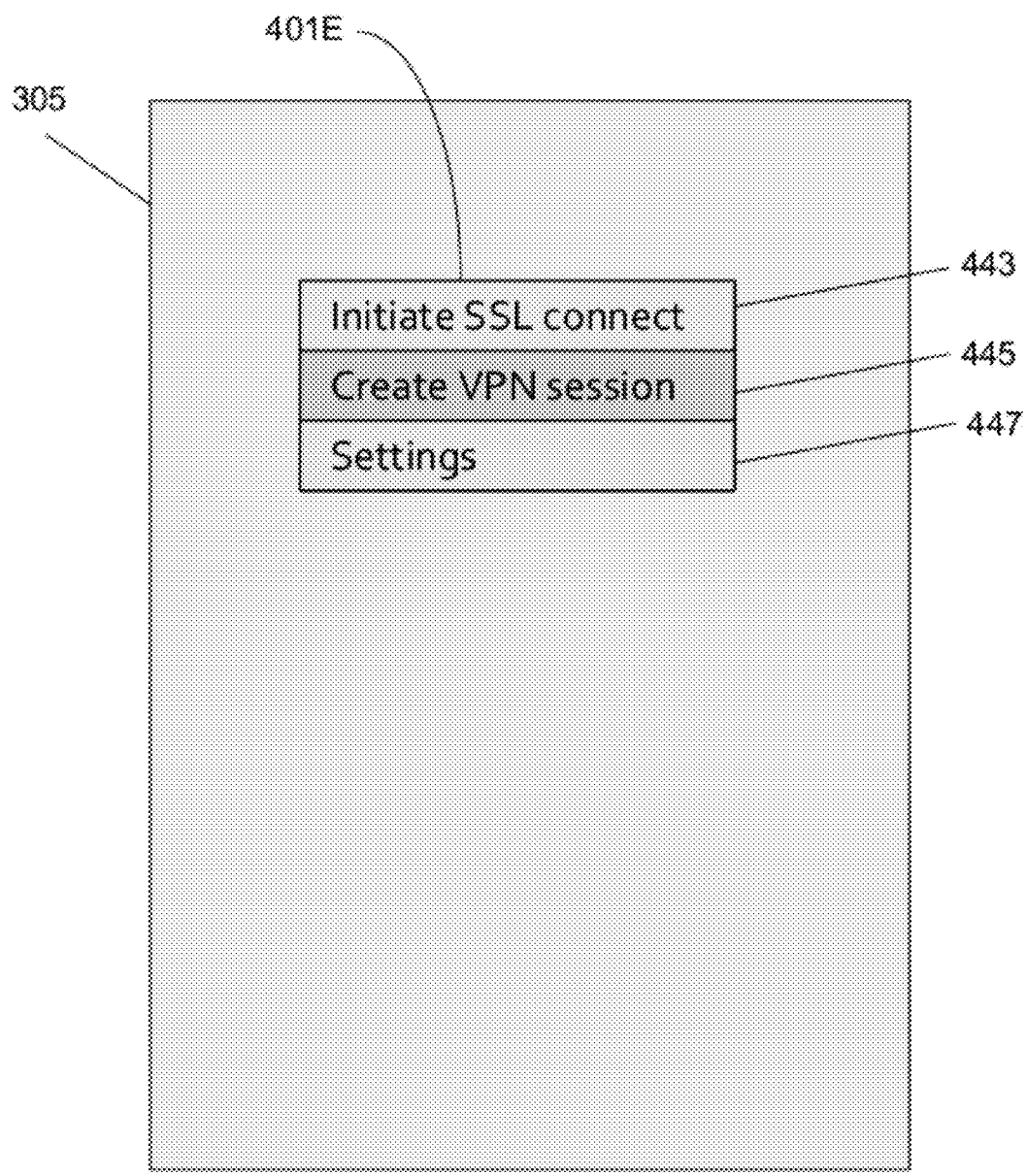
FIG. 4E shows an illustrative user interface of an SSL options sub-menu screen that may be rendered on a display of the handheld computing device in accordance with at least one aspect of the present disclosure.

FIG. 4E shows an illustrative user interface 401E of an SSL options sub-menu screen that may be rendered on a display 305 of the handheld computing device, such as handheld computing device 301 of FIG. 3, in accordance with at least one aspect of the present disclosure. FIG. 4E illustrates an example where a user has accessed the SSL option 441 in FIG. 4A. User interface 401E provides a user with the ability to enable a secure connect from the key credentials on the personal encryption device using either an SSL connection or through a previously configured virtual private network (VPN). Selection of the initiate SSL connect option 443 allows a user the ability to enable a secure connect from the key credentials on the personal encryption device using an SSL connection, which may include mutual authentication.

For example, a user of the handheld computing device without cryptography technology may desire to enable a secure connect using an SSL connection. Upon connection of the personal encryption device to the handheld computing device, the user may access the initiate SSL connect option 443 to make an SSL connection to another site. As such, the handheld computing device may access another computing device via an SSL connection when connected to the personal encryption device.

Also shown in FIG. 4E, user interface 401E may include a create VPN session option 445. Selection of create VPN session option 445 allows a user to enable a secure connect from the key credentials on the personal encryption device through a previously configured virtual private network (VPN). In such an example authentication may be required. Still further, user interface 401E may include a settings option 447. Selection of settings option 447 enables a user to configure and manage any VPN connections and also to establish rules for SSL connections. Illustrative rules for SSL connections may include but are not limited to minimum key lengths, SSL versions, and other rules. Although not shown, selection of initiate SSL connect option 443, create VPN session option 445, and/or settings option 447 may have a number of additional user interfaces rendered on display 305 to allow the user to input data to the handheld computing device and/or personal encryption device.

Figure 4F:
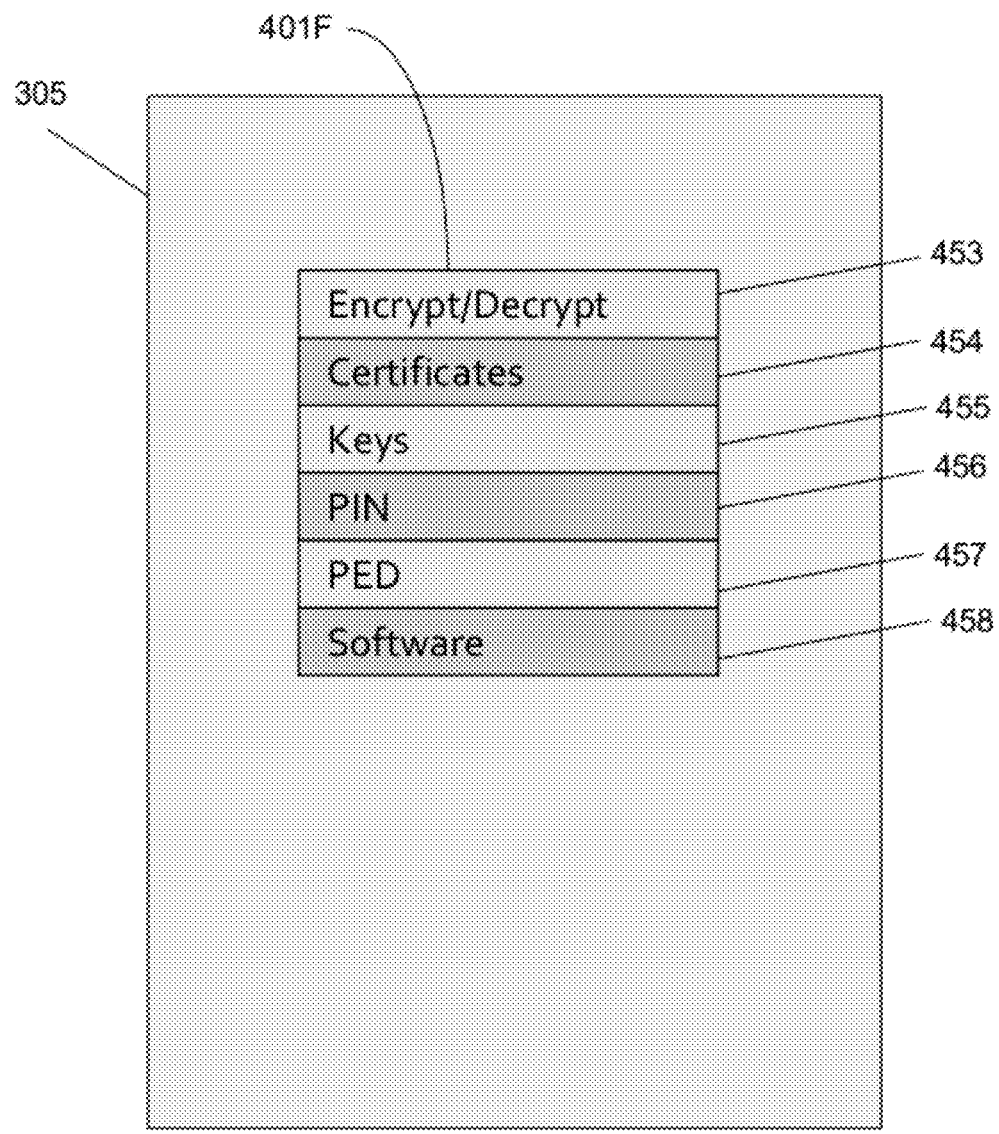
FIG. 4F shows an illustrative user interface of a maintenance options home screen that may be rendered on a display of the handheld computing device in accordance with at least one aspect of the present disclosure.

FIG. 4F shows an illustrative user interface 401F of a maintenance options home screen that may be rendered on a display 305 of the handheld computing device, such as handheld computing device 301 of FIG. 3, in accordance with at least one aspect of the present disclosure. By accessing one or more options of user interface 401F, a user of the handheld computing device with the personal encryption device connected thereto may perform maintenance on settings, certificates, keys, and/or additional data. As shown in FIG. 4F, user interface 401F includes an encrypt/decrypt option 453, a certificates option 454, a keys option 455, a personal identification number (PIN) option 456, a personal encryption device (PED) option 457 and a software option 458. Each of these illustrative option elements is described in more detail below with respect to FIGS. 5A-5F. As understood, user interface 401F is but one example of a maintenance options menu home screen that may be utilized and rendered on a display. The present disclosure is not limited to the examples provided herein and the examples of FIGS. 5A-5F are but some illustrative examples.

Figure 5A:
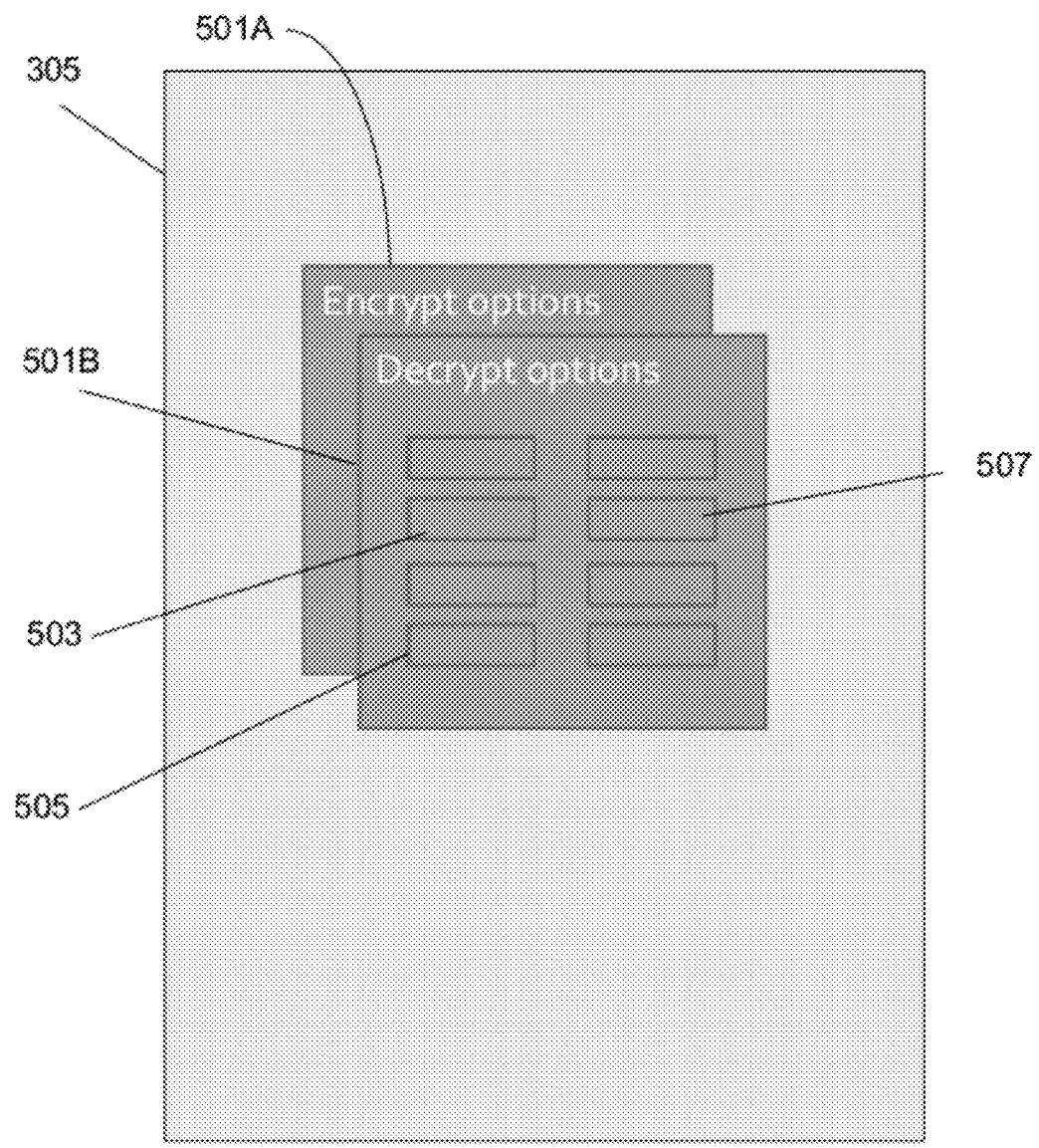
FIG. 5A shows illustrative user interface of an encrypt/decrypt options sub-menu screen of a maintenance options menu screen that may be rendered on a display of a handheld computing device in accordance with at least one aspect of the present disclosure.

FIG. 5A shows illustrative user interfaces 501A and 501B of an encrypt/decrypt options sub-menu screen of a maintenance options menu screen that may be rendered on a display 305 of a handheld computing device, such as handheld computing device 301 of FIG. 3, in accordance with at least one aspect of the present disclosure. FIG. 5A illustrates an example where a user has accessed the encrypt/decrypt option 453 in FIG. 4F. User interfaces 501A and 501B illustrate a configuration which enables a user to configure encrypt options on user interface 501A and decrypt options on user interface 501B. Alternatively, encrypt/decrypt option 453 in FIG. 4F may be to separately accessible options where selection of an encrypt option renders user interface 501A on the display of the handheld computing device while selection of a decrypt option renders user interface 501B on the display of the handheld computing device.

User interface 501A provides one or more options for a user with respect to encryption. Although not shown, example options may include settings for a folder to be encrypted, settings for a directory to be encrypted, an option for auto encryption upon removal of the personal encryption device, and automatic encryption of e-mails to specific recipients with PKI certificates maintained on the handheld computing device. These are but examples that may be included within user interface 501A and the present disclosure is not so limited. User interface 501B provides one or more options for user with respect to decryption. In this example, eight selectable decrypt options, such as option 503, option 505, an option 507, are rendered to the user. Options for the user with respect to decryption may include settings for a folder to be decrypted, settings for a directory to be decrypted, and option to automatically request a personal identification number (PIN) for decryption of the encrypted folders that may be applied upon insertion of the personal encryption device, and automatic decryption of e-mails from specific individuals. Although not shown, selection of one or more options in user interface 501A and/or 501B such as option 503, may have a number of additional user interfaces rendered on display 305 to allow the user to make further selections and/or input further data.

Figure 5B:
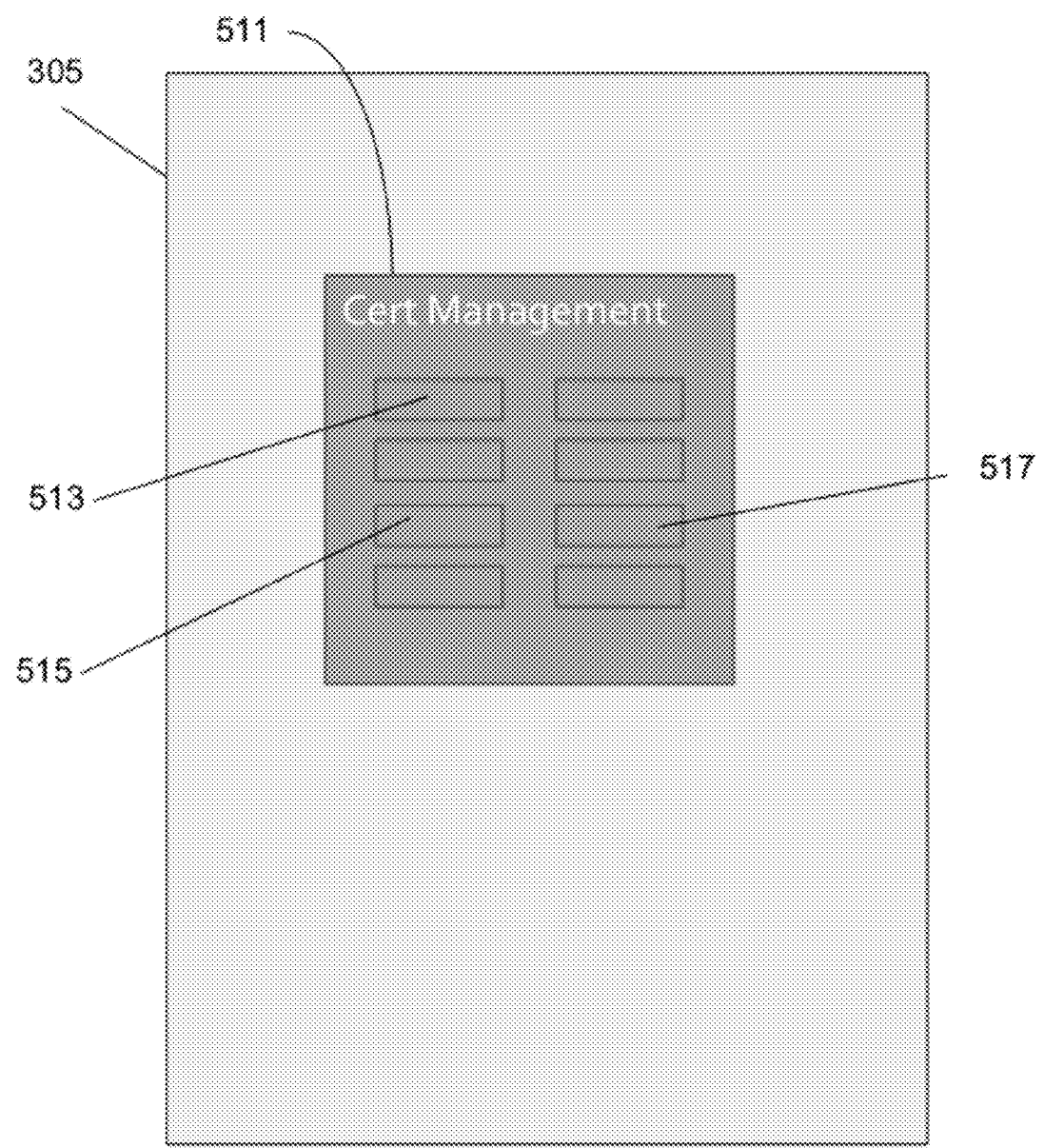
FIG. 5B shows an illustrative user interface of a certificates options sub-menu screen of a maintenance options menu screen that may be rendered on a display of a handheld computing device in accordance with at least one aspect of the present disclosure.

FIG. 5B shows an illustrative user interface 511 of a certificates options sub-menu screen of a maintenance options menu screen that may be rendered on a display 305 of the handheld computing device, such as handheld computing device 301 of FIG. 3, in accordance with at least one aspect of the present disclosure. FIG. 5B illustrates an example where a user has accessed certificate option 454 in FIG. 4F. User interface 511 illustrates a configuration which enables a user to manage certificates for encryption and/or decryption. User interface 511 includes one or more options for a user with respect to certificate management. In this example, eight selectable certificate management options, such as option 513, option 515, and option 517, are rendered to the user. Options for the user with respect to certificate management may include the request to certify a new public key or keys, certificate maintenance, such as exporting or deleting, and/or to import/save external recipient public key certificates for secure e-mail. Details of the nominated external certificate authority (CA) could be recorded within user interface 511. Although not shown, selection of one or more options in user interface 511, such as option 513, may have a number of additional user interfaces rendered on display 305 to allow the user to make further selections and/or input further data.

Figure 5C:
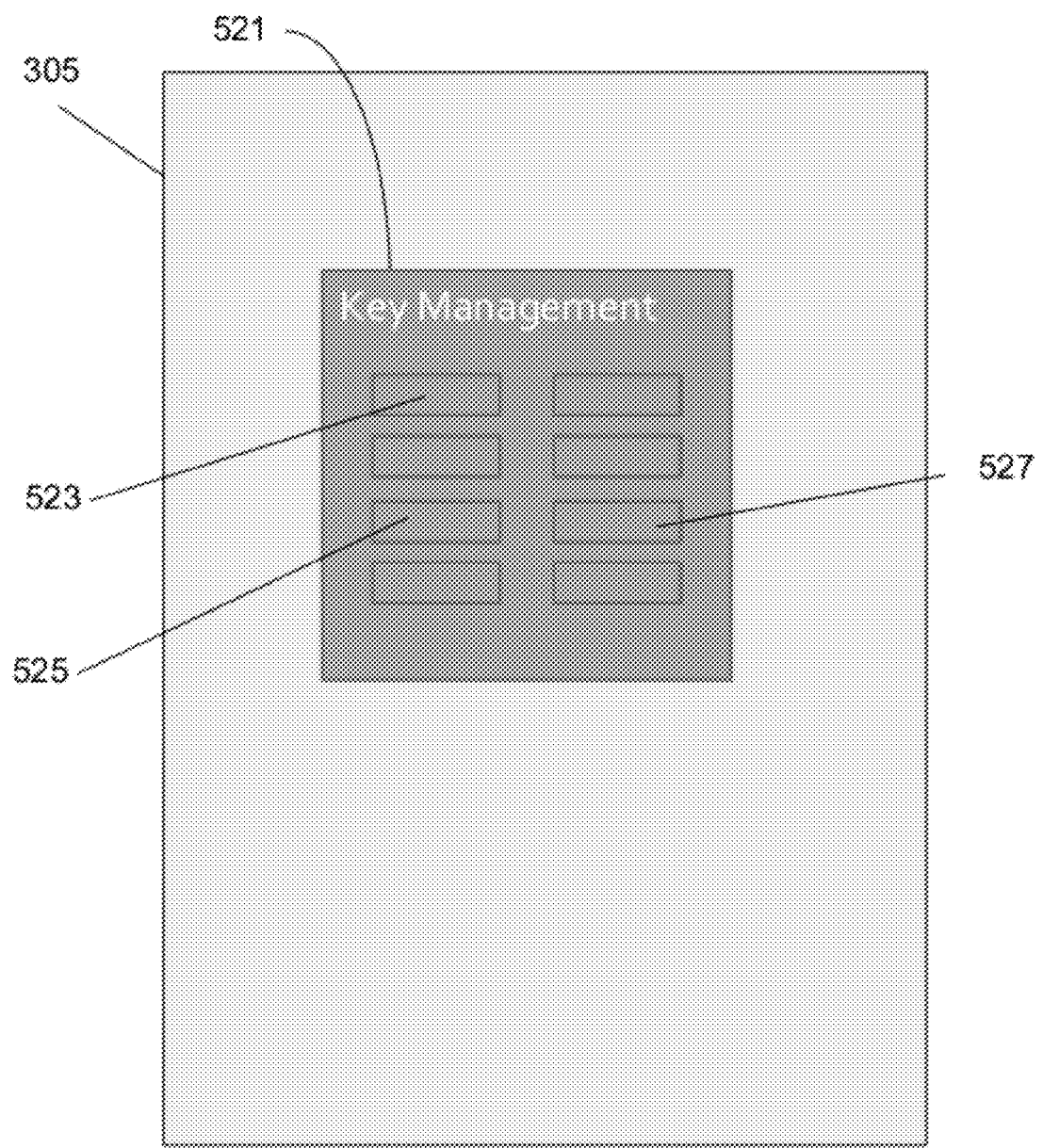
FIG. 5C shows an illustrative user interface of a key management options sub-menu screen of a maintenance options menu screen that may be rendered on a display of a handheld computing device in accordance with at least one aspect of the present disclosure.

FIG. 5C shows an illustrative user interface 521 of a key management options sub-menu screen of a maintenance options menu screen that may be rendered on a display 305 of the handheld computing device, such as handheld computing device 301 of FIG. 3, in accordance with at least one aspect of the present disclosure. FIG. 5C illustrates an example where a user has accessed keys option 455 in FIG. 4F. User interface 521 illustrates a configuration which enables the user to perform key management for encryption and/or decryption. User interface 521 includes one or more options for a user with respect to key management. In this example, 8 selectable key management options, such as option 523, option 525, and option 527, are rendered to the user. Options for the user with respect to key management may include the generation of new keys, the deletion of old/expired keys, settings relating to the type of key, a key length, and exponent length, expiry dates, and the ability to view information regarding a key. Although not shown, selection of one or more options in user interface 521, such as option 523, may have a number of additional user interfaces rendered on display 305 to allow the user to make further selections and/or input further data.

Figure 5D:
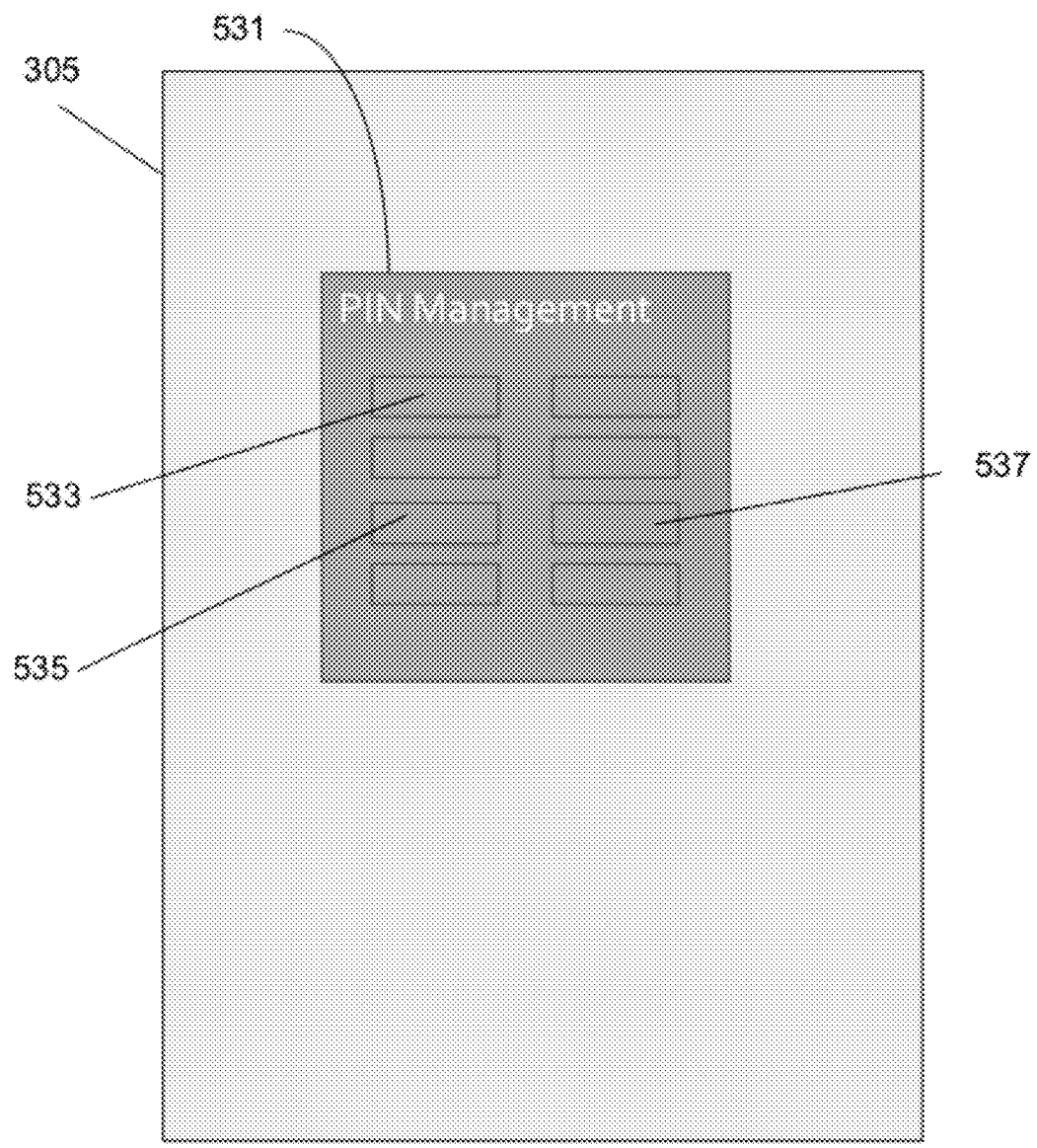
FIG. 5D shows an illustrative user interface of a personal identification number (PIN) management options sub-menu screen of a maintenance options menu screen that may be rendered on a display of a handheld computing device in accordance with at least one aspect of the present disclosure.

FIG. 5D shows an illustrative user interface 531 of a personal identification number (PIN) management options sub-menu screen of a maintenance options menu screen that may be rendered on a display 305 of the handheld computing device, such as handheld computing device 301 of FIG. 3, in accordance with at least one aspect of the present disclosure. FIG. 5D illustrates an example where a user has accessed PIN option 456 in FIG. 4F. User interface 531 illustrates a configuration which enables a user to perform personal identification number (PIN) management. In this example, eight selectable PIN management options, such as option 533, option 535, and option 537, are rendered to the user. Options for the user with respect to PIN management may include an option for a forgotten PIN, the ability to change a PIN, the ability to alter settings regarding a PIN length, and a number of attempts for entry of a PIN before locking access. Although not shown, selection of one or more options in user interface 531, such as option 533, may have a number of additional user interfaces rendered on display 305 to allow the user to make further selections and/or input further data.

Figure 5E:
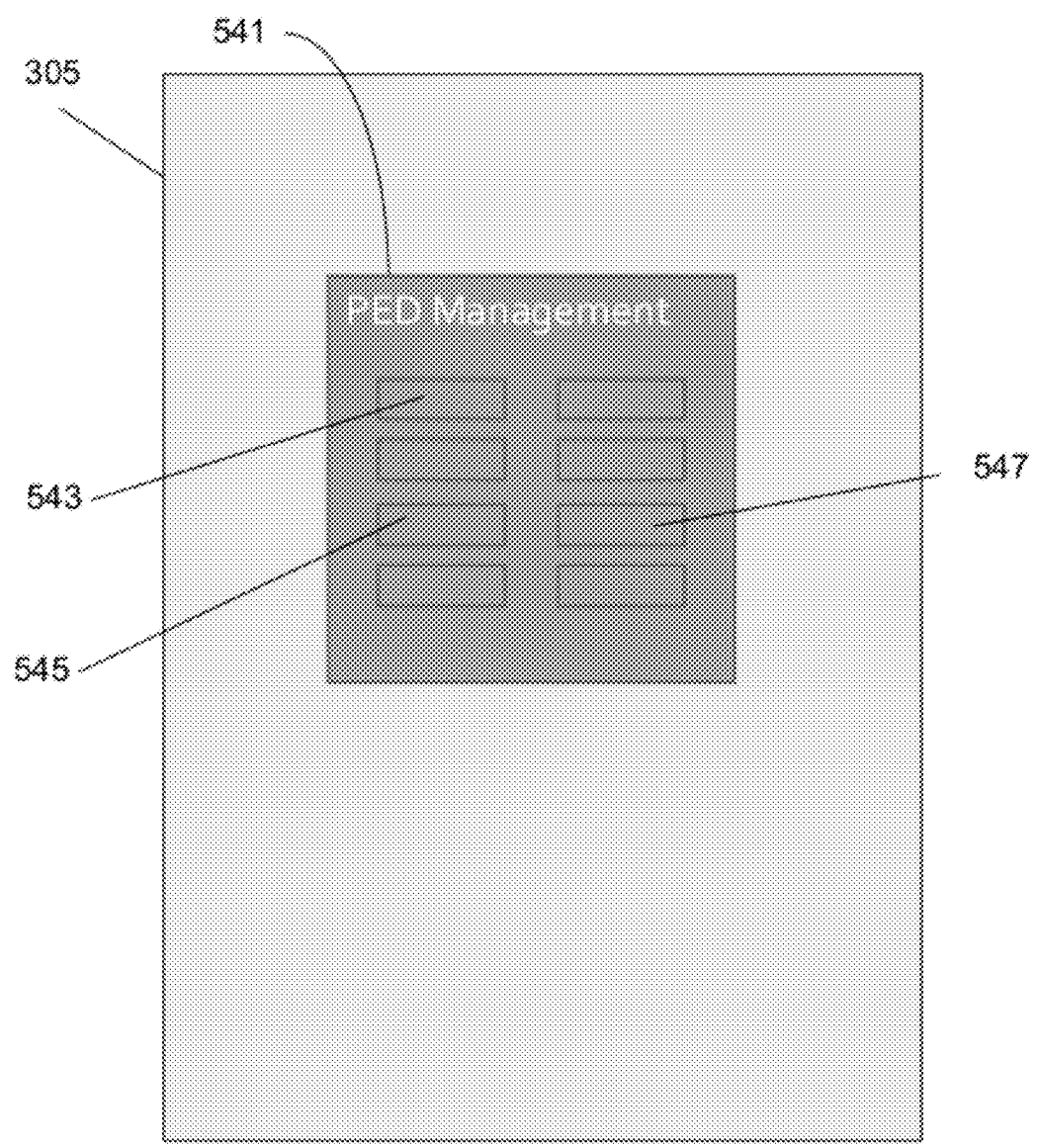
FIG. 5E shows an illustrative user interface of a personal encryption device (PED) options sub-menu screen of a maintenance options menu screen that may be rendered on a display of a handheld computing device in accordance with at least one aspect of the present disclosure.

FIG. 5E shows an illustrative user interface 541 of a personal encryption device (PED) options sub-menu screen of a maintenance options menu screen that may be rendered on a display 305 of the handheld computing device, such as handheld computing device 301 of FIG. 3, in accordance with at least one aspect of the present disclosure. FIG. 5E illustrates an example where a user has accessed PED option 457 in FIG. 4F. User interface 541 illustrates a configuration which enables the user to perform configuration of the personal encryption device (PED). In this example, eight selectable PED management options, such as option 543, option 545, and option 547, are rendered to the user. Options for the user with respect to PED management may include an option to change settings as to whether the PED is locked or tampered with upon exceeding a threshold number of invalid PIN entries by a user, and an option to confirm a serial number and/or other identification data of the personal encryption device may be utilized with the handheld computing device. Although not shown, selection of one or more options in user interface 541, such as option 543, may have a number of additional user interfaces rendered on display 305 to allow the user to make further selections and/or to input further data.

Figure 5F:
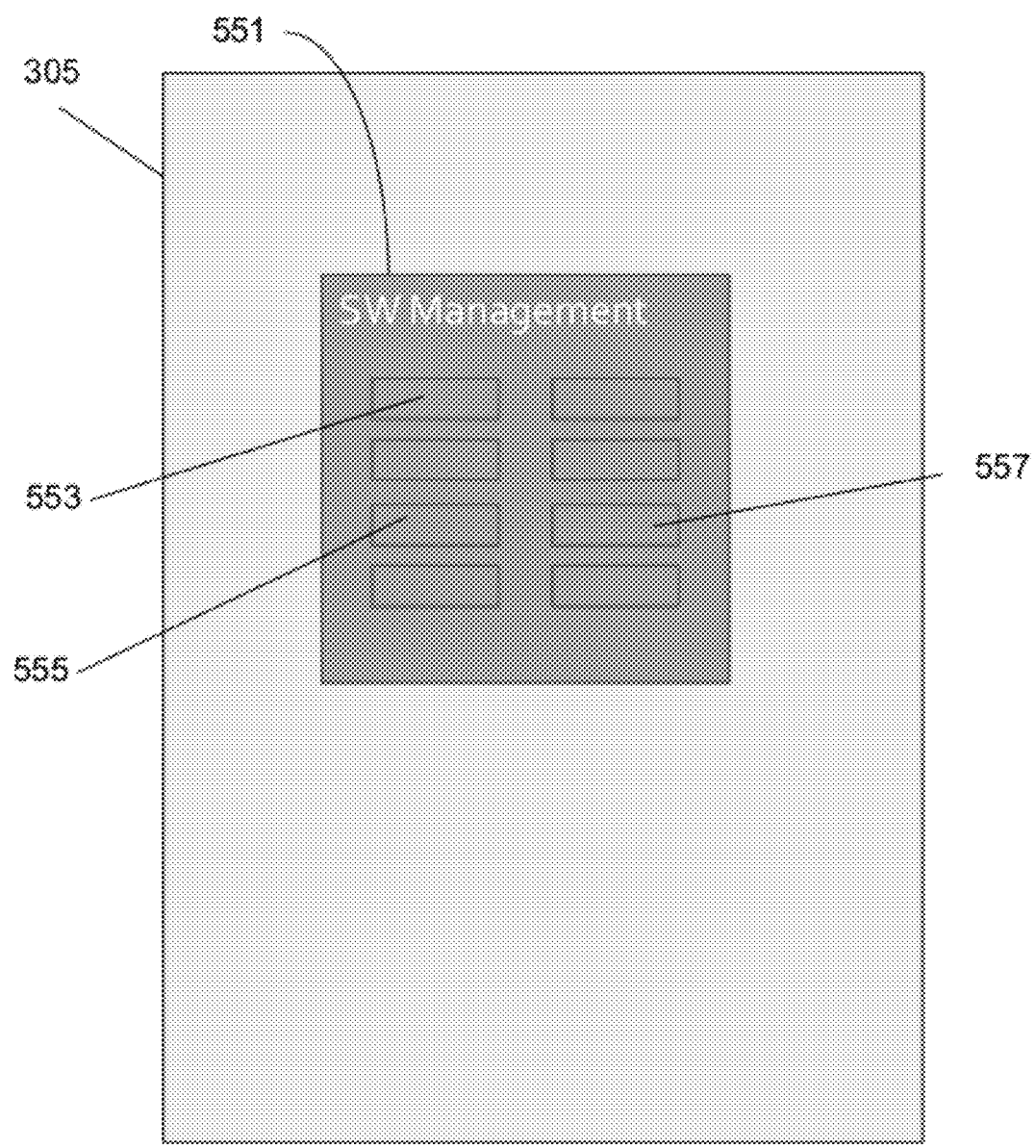
FIG. 5F shows an illustrative user interface of a software (SW) management options sub-menu screen of a maintenance options menu screen that may be rendered on a display of a handheld computing device in accordance with at least one aspect of the present disclosure.

FIG. 5F shows an illustrative user interface 551 of a software (SW) management options sub-menu screen of a maintenance options menu screen that may be rendered on a display 305 of the handheld computing device, such as handheld computing device 301 of FIG. 3, in accordance with at least one aspect of the present disclosure. FIG. 5F illustrates an example where a user has accessed software option 458 FIG. 4F. User interface 551 illustrates a configuration which enables the user to manage software associated with the personal encryption device. In this example, eight selectable software management options, such as option 553, option 555, and option 557, are rendered to the user. Options for the user with respect to software management may include an option sub-menu for downloading driver executables/interfaces to the handheld computing device, upgrading internal firmware of the personal encryption device, reviewing information regarding a current version of software. Although not shown, selection of one or more options in user interface 551, such as option 553, may have a number of additional user interfaces rendered on display 305 to allow the user to make further selections and/or to input further data.

Figure 6:
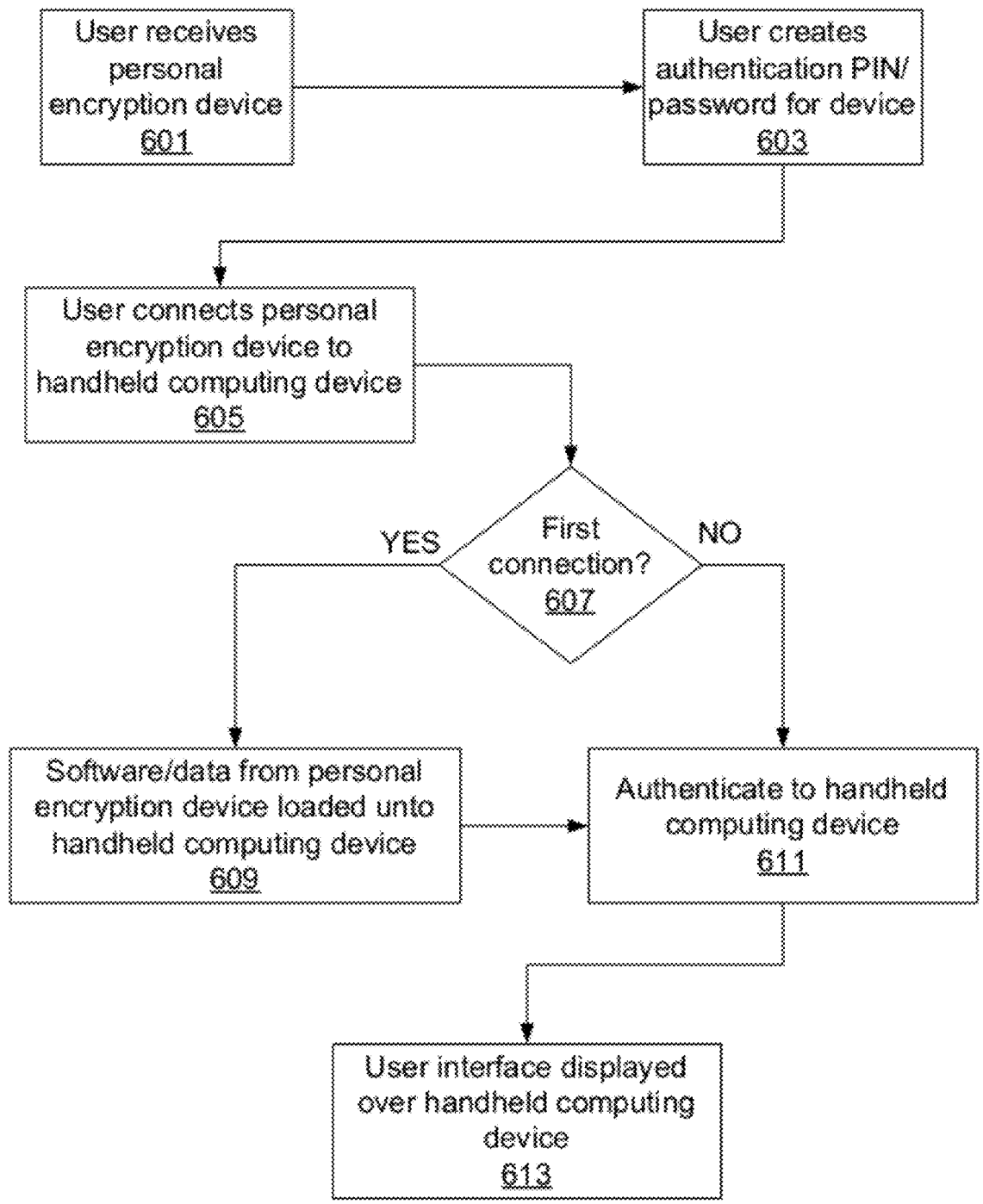
FIG. 6 is an example flow chart of a method for initially configuring a personal encryption device and a handheld computing device in accordance with at least one aspect of the present disclosure.

FIG. 6 is an example flow chart of a method for initially configuring a personal encryption device, such as personal encryption device 351 in FIG. 3, and a handheld computing device, such as handheld computing device 301 in FIG. 3, in accordance with at least one aspect of the present disclosure. The process starts and at 601, a user receives a personal encryption device. In one embodiment, the personal encryption device may have generated RSA keys and a PK certificate already applied. The present disclosure is not limited to RSA algorithm technology but may include any outward them for public key cryptography. The PK certificate is signed by an external certificate authority (CA). In 603, the user creates an authentication personal identification number (PIN)/password for the personal encryption device.

Proceeding to 605, the user may connect her personal encryption device to a handheld computing device. For example, the user may connect personal encryption device 351 to handheld computing device 301 through an access port 303 as illustrated in FIG. 3. In 607, a determination may be made as to whether this is a first connection of the personal encryption device to the handheld computing device. If this is not a first connection the process may move to 611. If this is a first connection of the personal encryption device to the handheld computing device, in 609, software and/or data from the personal encryption device may be loaded onto the handheld computing device. The software and/or data may provide the options for usage of the personal encryption device, such as one or more of the menu screens illustrated in FIGS. 4A-5F. The software and/or data may include a PK certificate for storage on the handheld computing device. In an alternative embodiment, step 609 may be an option at any time the personal encryption device is connected to the handheld computing device in such a situation for newer software and/or data.

In 611, the user may be required to authenticate connection of the personal encryption device to the handheld computing device. In an alternative embodiment, step 611 may occur as a first step after connection of the personal encryption device to the handheld computing device. Proceeding to 613, a user interface can be displayed on the handheld computing device. The user interface may be displayed over a home screen user interface of the handheld computing device or the user interface may be displayed in place of the home screen user interface of the handheld computing device. The user interface of step 613 may be user interface 401A of FIG. 4A and/or another user interface described with respect to any of FIGS. 4B-5F.

Figure 7A:
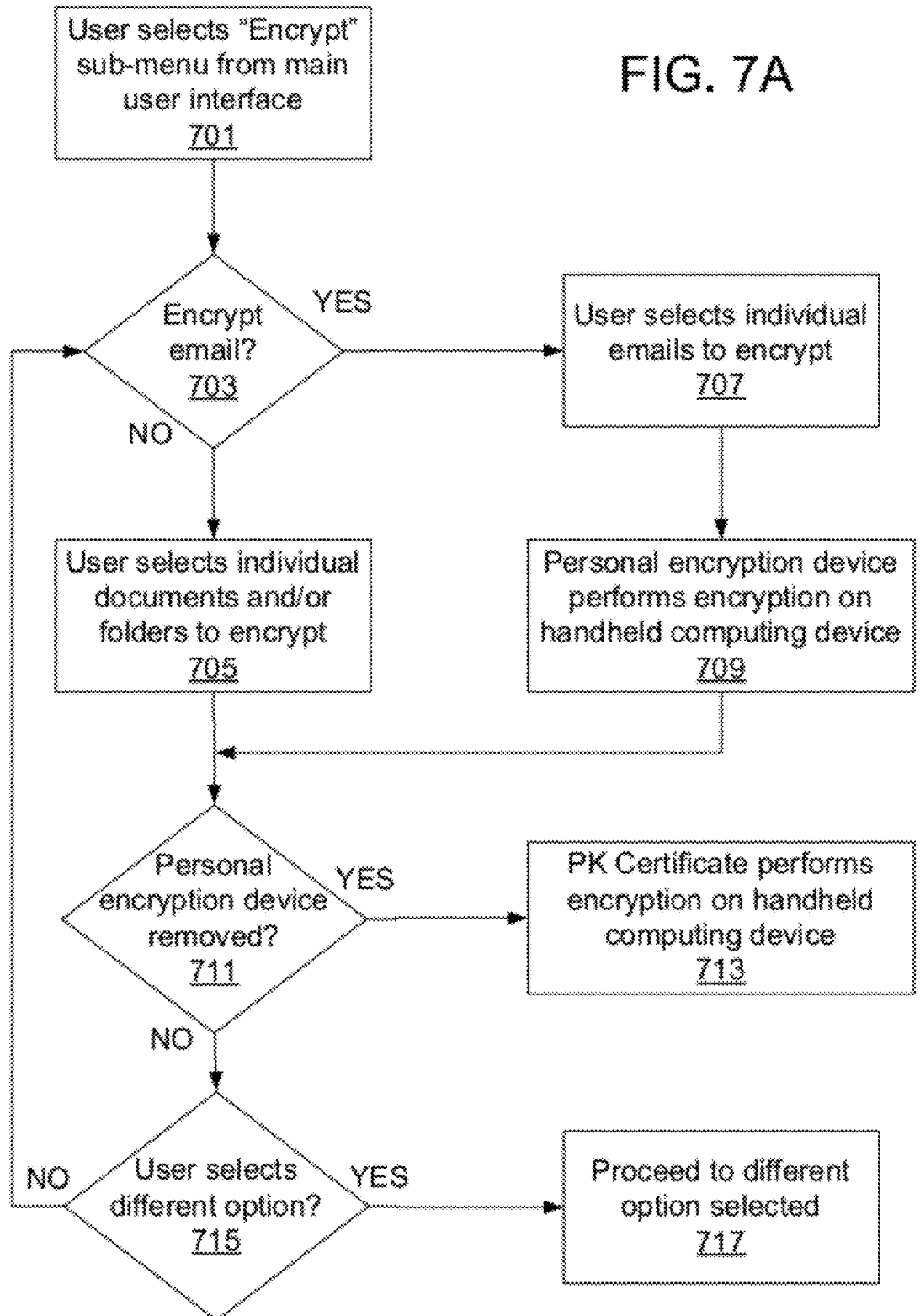
FIG. 7A is an example flow chart of an illustrative method for file encryption in accordance with at least one aspect of the present disclosure.

FIG. 7A is an example flow chart of an illustrative method for file encryption in accordance with at least one aspect of the present disclosure. In 701, a user may select an encrypt sub-menu option from a main user interface. Step 701 may be implemented by a user accessing encrypt option 411 in FIG. 4A. In 703, a determination may be made as to whether the requested encryption is directed to an e-mail. For example, a determination may be made as to whether a user selected encrypt e-mail option 415 as shown in FIG. 4B. If the user did not select to encrypt an e-mail in 703, such as the user selecting encrypt doc/folder option 413 in FIG. 4B, the process moves to 705 where a user may select one or more individual documents, folders, and/or directories to encrypt. In the example of the user desiring to encrypt a document, step 705 may include a user drilling down within a file tree to the appropriate document for encryption. The process then proceeds to 711. If the user did select to encrypt an e-mail in 703, the process proceeds to 707.

In 707, the user may select one or more individual e-mails to encrypt. For example, the user may have selected encrypt e-mail option 415 in FIG. 4B. In the example of the user selecting individual e-mails for encryption, step 707 may include a user drilling down within an e-mail database to the appropriate e-mail for encryption. The process proceeds to 709 where the personal encryption device may perform encryption of the e-mail on the handheld computing device. The process then proceeds to 711.

In 711, a determination may be made as to whether the personal encryption device has been removed/disconnected from the handheld computing device. If the personal encryption device has been removed, in 713, the PK certificate maintained on the handheld computing device may perform encryption as necessary on one or more documents, folders, and/or directories on the handheld computing device. Identification of the relevant one or more documents, folders, and/or directories on the handheld computing device for encryption in the occurrence of removal of the personal encryption device may be specified by a user through maintenance option 451 of FIG. 4A. The PK certificate maintained on the handheld computing device utilized for encryption on one or more documents, folders, and/or directories on the handheld computing device was initially received from the personal encryption device.

If the personal encryption device has not been removed in 711, the process may proceed to 715 where determination may be made as to whether the user selects a different option. For example a determination may be made as to whether the user has returned to a main user interface, such as user interface 401A in FIG. 4A. If the user has selected a different option, the process proceeds to 717 where the different option selected is processed. If the user has not selected a different option in 715, the process may return to 703.

Figure 7B:
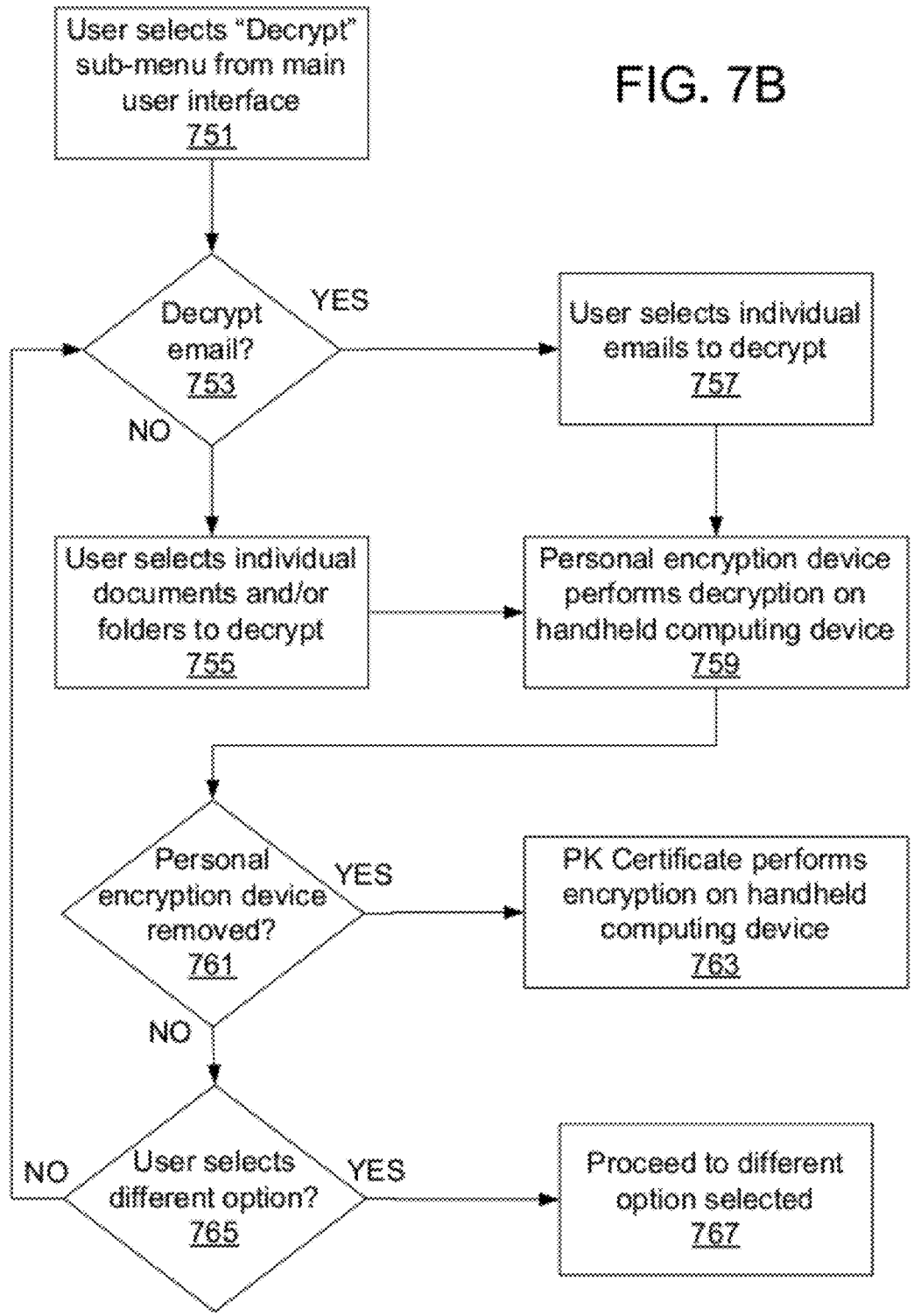
FIG. 7B is an example flow chart of an illustrative method for file decryption in accordance with at least one aspect of the present disclosure.

FIG. 7B is an example flow chart of an illustrative method for file decryption in accordance with at least one aspect of the present disclosure. In 751, a user may select a decrypt submenu option from the main user interface. Step 751 may be implemented by a user accessing decrypt option 421 in FIG. 4A. In 753, a determination may be made as to whether the requested decryption is directed to an e-mail. For example, a determination may be made as to whether a user selected decrypt e-mail option 425 as shown in FIG. 4C. If the user did not select to decrypt an e-mail in 753, such as the user selecting decrypt doc/folder option 423 in FIG. 4C, the process moves to 755 where a user may select one or more individual documents, folders, and/or directories to decrypt. In the example of the user desiring to decrypt a document, step 755 may include a user drilling down within a file tree to the appropriate document for decryption. The process then proceeds to 759. If the user did select to decrypt an e-mail in 753, the process proceeds to 757.

In 757, the user may select one or more individual e-mails to decrypt. For example the user may have selected decrypt e-mail option 425 in FIG. 4C. In the example of the user selecting individual e-mails for decryption, step 757 may include a user drilling down within an e-mail database to the appropriate e-mail for decryption. Whether from a selected one or more e-mails in 757 or a selected one or more documents, folders, and/or directories in 755, in 759, the personal encryption device may perform decryption of the selected e-mail, document, folder, and/or directory on the handheld computing device. The process then proceeds to 761.

In 761, a determination may be made as to whether the personal encryption device has been removed/disconnected from the handheld computing device. If the personal encryption device has been removed, in 763, the PK certificate maintained on the handheld computing device may perform encryption as necessary on one or more documents, folders, and/or directories on the handheld computing device. Identification of the relevant one or more documents, folders, and/or directories on the handheld computing device for encryption in the occurrence of removal of the personal encryption device may be specified by a user through maintenance option 451 of FIG. 4A. The PK certificate maintained on the handheld computing device utilized for encryption on one or more documents, folders, and/or directories on the handheld computing device was initially received from the personal encryption device.

If the personal encryption device has not been removed in 761, the process may proceed to 765 where determination may be made as to whether the user selects a different option. For example a determination may be made as to whether the user has returned to a main user interface, such as user interface 401A in FIG. 4A. If the user has selected a different option, the process proceeds to 767 where the different option selected is processed. If the user has not selected a different option in 765, the process may return to 753.

Figure 8:
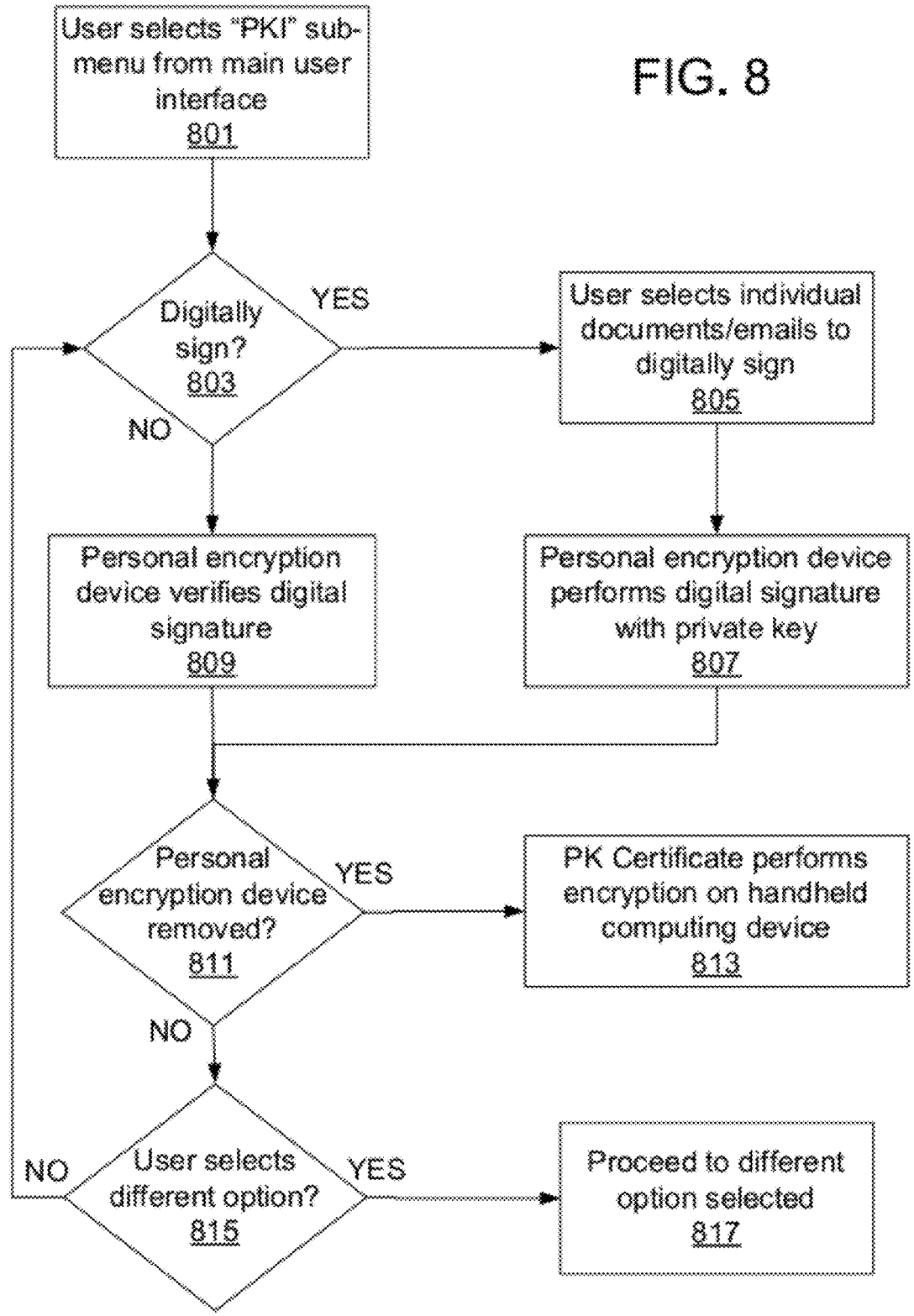
FIG. 8 is an example flow chart of an illustrative method for digital signature creation or verification in accordance with at least one aspect of the present disclosure.

FIG. 8 is an example flow chart of an illustrative method for digital signature creation or verification in accordance with at least one aspect of the present disclosure. In 801, the user may select a PKI submenu option from the main user interface. Step 801 may be implemented by user accessing PKI option 431 in FIG. 4A. In 803, a determination may be made as to whether the user has requested to digitally sign a document. For example, a determination is then made as to whether user selected digitally sign option 433 in FIG. 4D. If the user did select to digitally sign a document in 803, such as the user selecting digitally sign option 433 in FIG. 4D, the process moves to 805 where a user may select one or more individual documents and/or e-mails to digitally sign. As part of this process, the user may be required to authenticate to the personal encryption device using a personal identification number (PIN)/password. In the example of the user desiring to digitally sign a document, step 805 may include a user drilling down within a file tree to the appropriate document for digitally signing. In 807, the personal encryption device may perform a digital signature on the selected document and/or e-mail with the private secret key maintained on the personal encryption device. The process then proceeds to 811.

If the user did not select to digitally sign a document 803, such as the user selecting verify signature option 435 in FIG. 4D, the process moves to 809 where the personal encryption device may verify a digital signature received from another source. In the example of the user desiring to verify the digital signature of a document from an external source, step 809 may include a user drilling down within a file tree to the appropriate digitally signed document for verification.

In 811, a determination may be made as to whether the personal encryption device has been removed/disconnected from the handheld computing device. If the personal encryption device has been removed, in 813, the PK certificate maintained on the handheld computing device may perform encryption as necessary on one or more documents, folders, and/or directories on the handheld computing device. Identification of the relevant one or more documents, folders, and/or directories on the handheld computing device for encryption in the occurrence of removal of the personal encryption device may be specified by a user through maintenance option 451 of FIG. 4A. The PK certificate maintained on the handheld computing device utilized for encryption on one or more documents, folders, and/or directories on the handheld computing device was initially received from the personal encryption device.

If the personal encryption device has not been removed in 811, the process may proceed to 815 where determination may be made as to whether the user selects a different option. For example a determination may be made as to whether the user has returned to a main user interface, such as user interface 401A in FIG. 4A. If the user has selected a different option, the process proceeds to 817 where the different option selected is processed. If the user has not selected a different option in 815, the process may return to 803.

Figure 9:
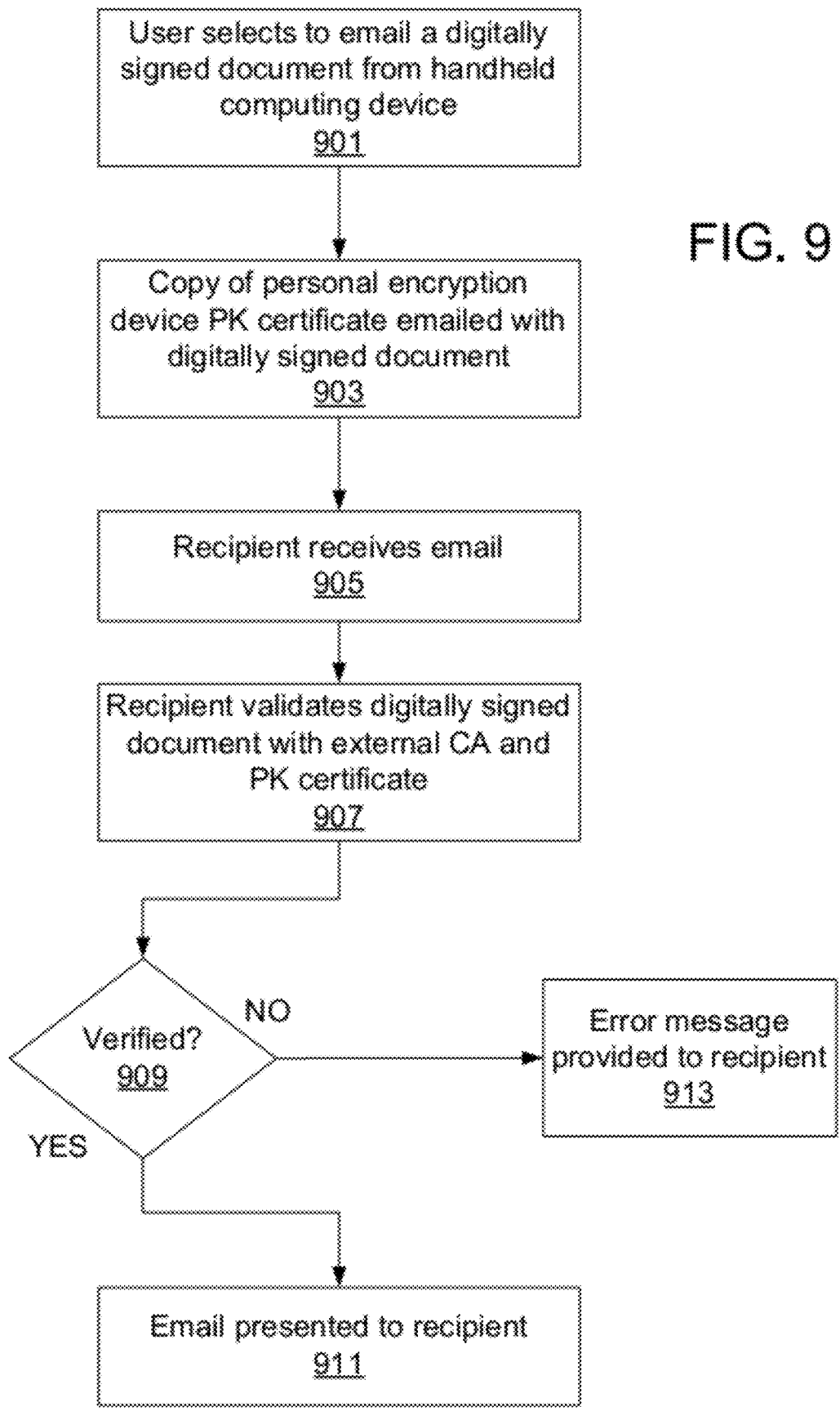
FIG. 9 is an example flow chart of an illustrative method for emailing signed documents in accordance with at least one aspect of the present disclosure.

FIG. 9 is an example flow chart of an illustrative method for emailing signed documents in accordance with at least one aspect of the present disclosure. In 901, a user selects to e-mail a digitally signed document from the handheld computing device. It should be understood, in order to e-mail a digitally signed document from the handheld computing device, the personal encryption device may need to be connected. In 903, a copy of the personal encryption device PK certificate may be e-mailed with the digitally signed document to a recipient. At 905, the recipient receives the e-mail.

Proceeding to 907, the recipient system may validate the digitally signed document within external certificate authority (CA) and the PK certificate of the personal encryption device included with the received e-mail.

Proceeding to 909, a determination may be made as to whether the digitally signed document may be verified. If the digitally signed document is verified by the recipient system, the e-mail may be presented to the recipient for viewing and/or download in 911. If the digitally signed document is not verified by the recipient system, an error message may be provided to the recipient in 913.

Figure 10:
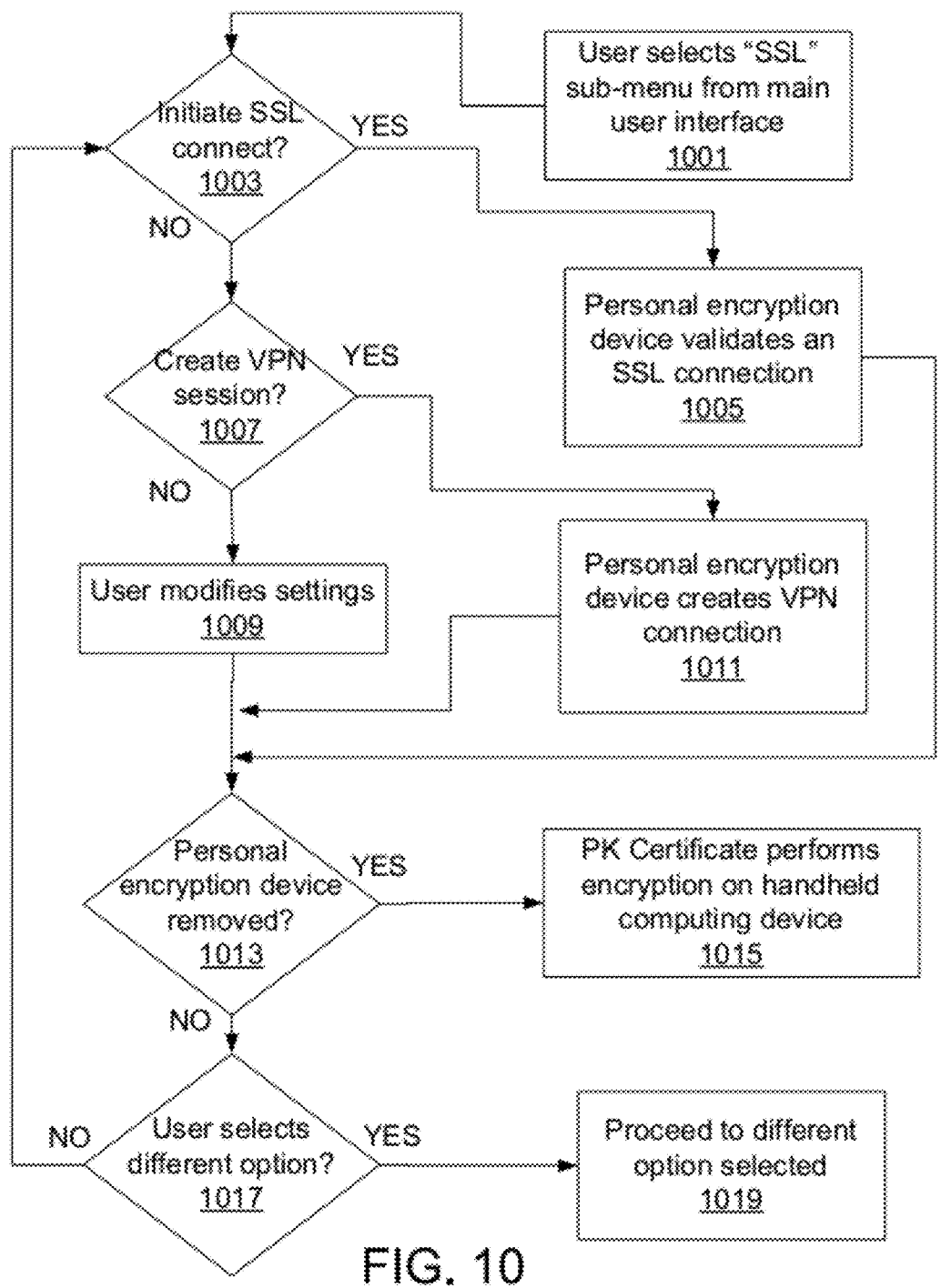
FIG. 10 is an example flow chart of an illustrative method for establishing SSL connections in accordance with at least one aspect of the present disclosure.

FIG. 10 is an example flow chart of an illustrative method for establishing SSL connections in accordance with at least one aspect of the present disclosure. In 1001, a user may select an SSL submenu option from a main user interface. Step 1001 may be implemented by user accessing SSL option 441 in FIG. 4A. In 1003, a determination is made as to whether the user has selected an initiate SSL connect option from the submenu user interface. Step 1003 may be a determination as to whether the user has selected initiate SSL connect option 443 in FIG. 4E. If the user did select initiate SSL connect option in 1003, the process proceeds to 1005, where the personal encryption device validates an SSL connection. Validation in 1005 may include mutual authentication validating the SSL connection server response and/or determining an appropriate key length. The process may then proceed to 1013.

If the user did not select initiate SSL connect option in 1003, the process proceeds to 1007, where determination may be made as to whether the user has selected a create VPN session option from the main user interface. Step 1007 may be a determination as to whether the user has selected create VPN session option 445 in FIG. 4E. If the user did select create VPN option in 1007, the process proceeds to 1011, where personal encryption device creates a VPN connection and/or enables a secure connection through a previously configured VPN. In such an example, authentication may be required for enabling a secure connection through a previously configured VPN.

If the user did not select create VPN session option in 1007, the process proceeds to 1009, where the user may modify or more settings. Step 1009 may be user selecting settings option 447 in FIG. 4E. User options for the settings in 1009 may include configuring and managing any VPN connection and/or to establish rules for SSL connections including minimum key lengths and SSL versions. The process then moves to 1013.

In 1013, a determination may be made as to whether the personal encryption device has been removed/disconnected from the handheld computing device. If the personal encryption device has been removed, in 1015, the PK certificate maintained on the handheld computing device may perform encryption as necessary on one or more documents, folders, and/or directories on the handheld computing device. Identification of the relevant one or more documents, folders, and/or directories on the handheld computing device for encryption in the occurrence of removal of the personal encryption device may be specified by a user through maintenance option 451 of FIG. 4A. The PK certificate maintained on the handheld computing device utilized for encryption on one or more documents, folders, and/or directories on the handheld computing device was initially received from the personal encryption device.

If the personal encryption device has not been removed in 1013, the process may proceed to 1017 where determination may be made as to whether the user selects a different option. For example a determination may be made as to whether the user has returned to a main user interface, such as user interface 401A in FIG. 4A. If the user has selected a different option, the process proceeds to 1019 where the different option selected is processed. If the user has not selected a different option in 1017, the process may return to 1003.

FIG. 11 is an example flow chart of an illustrative method for using PK certificates of others in accordance with at least one aspect of the present disclosure. In 1101, a user may save one or more PK certificates received from other individuals on the handheld computing device. The PK certificates received from other individuals may be on the personal encryption device and transferred to the handheld computing device. In 1103, the user may select a saved PK certificate for encrypting an e-mail to a particular recipient. The recipient may be the individual associated with the PK certificate. For example, a user may desire to send an encrypted e-mail to a specific individual. A PK certificate for the specific individual may have been saved on the handheld computing device in 1101. As such, in 1103, the user may select the saved PK certificate of the specific individual.

Proceeding to 1105, with the personal encryption device connected thereto, the handheld computing device then sends the encrypted e-mail to the recipient, i.e., the specific individual. Then in 1107, the recipient may receive the e-mail and may decrypt the e-mail in accordance with the private key of the specific individual.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative Figures may be performed in other than the recited order, and that one or more steps illustrated may be optional in accordance with aspects of the embodiments.

What is claimed is:

1. A method comprising:
   receiving, at a handheld computing device from a personal encryption device, data for operating the handheld computing device with the personal encryption device, the data for operating the handheld computing device with the personal encryption device including a PK certificate of the personal encryption device;
   physically connecting the personal encryption device to the handheld computing device;
   responsive to the connecting, displaying a main screen user interface on a display of the handheld computing device, the main screen user interface including at least one cryptography option for a user of the handheld computing device;
   receiving, at the handheld computing device, a user-defined input representative of selection of a first cryptography option of the at least one cryptography option;
   implementing, by the handheld computing device and the personal encryption device, at least one cryptography process associated with the selected first cryptography option;
   maintaining the PK certificate on the handheld computing device;
   determining whether the personal encryption device has been disconnected from the handheld computing device; and
   responsive to determining the personal encryption device has been disconnected from the handheld computing device, encrypting at least one of: a document, a folder, and a directory with a key of the PK certificate of the personal encryption device maintained on the handheld computing device.

2. The method of claim 1, wherein the selected first cryptography option is an option to encrypt the at least one of: a document, a folder, a directory, and an e-mail, the implementing including encrypting the at least one document, folder, directory, and e-mail.

3. The method of claim 1, wherein the selected first cryptography option is an option to decrypt the at least one of: a document, a folder, a directory, and an e-mail, the implementing including decrypting the at least one document, folder, directory, and e-mail.

4. The method of claim 1, wherein the selected first cryptography option is an option to digitally sign a document or verify a digitally signed document, the implementing including digitally signing the document with a private key on the personal encryption device or verifying the digitally signed document from an external source.

5. The method of claim 4, wherein the implementing further comprising emailing, by the handheld computing device, the digitally signed document with a copy of the PK certificate of the personal encryption device.

6. The method of claim 1, wherein the selected first cryptography option is an option to enable a secure connection using a private key on the personal encryption device using one of an SSL connection or through a virtual private network, the implementing including validating the SSL connection or connecting to the virtual private network.

7. The method of claim 1, further comprising receiving, at the handheld computing device, a PK certificate of a recipient, wherein the selected first cryptography option is an option to encrypt an e-mail to the recipient, the implementing including encrypting the e-mail with a key of the PK certificate of the recipient.

8. An apparatus comprising:
at least one processor; and
at least one memory having stored therein computer executable instructions, that when executed by the at least one processor, cause the apparatus to perform a method of:
transmitting data for operating a handheld computing device with the apparatus, the handheld device being physically connected to the apparatus and the data including a PK certificate of the apparatus and instructions for rendering a main screen user interface on a display of the handheld computing device, the main screen user interface including at least one cryptography option for a user of the handheld computing device;
implementing, by the apparatus and the handheld computing device, at least one cryptography process associated with a selected first cryptography option of the at least one cryptography option;
maintaining the PK certificate on the handheld computing device;
determining whether the apparatus has been disconnected from the handheld computing device; and
responsive to determining that the apparatus has been disconnected from the handheld computing device, encrypting at least one of: a document, a folder, and a directory with a key of the PK certificate of the apparatus maintained on the handheld computing device.

9. The apparatus of claim 8, wherein the selected first cryptography option is an option to encrypt or decrypt the at least one of: a document, a folder, a directory, and an e-mail, the implementing including encrypting or decrypting the at least one document, folder, directory, and e-mail.

10. The apparatus of claim 8, wherein the selected first cryptography option is an option to digitally sign a document or verify a digitally signed document, the implementing including digitally signing the document with a private key on the apparatus or verifying the digitally signed document from an external source.

11. The apparatus of claim 8, wherein the selected first cryptography option is an option to enable a secure connection using a private key on the apparatus using one of an SSL connection or through a virtual private network, the implementing including validating the SSL connection or connecting to the virtual private network.

12. The apparatus of claim 8, the at least one memory having stored therein computer executable instructions, that when executed by the at least one processor, further cause the apparatus to perform transmitting a PK certificate of a recipient, wherein the selected first cryptography option is an option to encrypt an e-mail to the recipient, the implementing including encrypting the e-mail with a key of the PK certificate of the recipient.

13. One or more non-transitory computer-readable media storing computer-readable instructions that, when executed by at least one processor, cause the at least one processor to perform a method of:
transmitting data for operating a handheld computing device with the processor, the handheld computing device being physically connected to the processor and the data including a PK certificate of the processor and instructions for rendering a main screen user interface on a display of the handheld computing device, the main screen user interface including at least one cryptography option for a user of the handheld computing device;
implementing, by the processor and handheld computing device, at least one cryptography process associated with a selected first cryptography option of the at least one cryptography option;
maintaining the PK certificate on the handheld computing device;
determining whether the processor has been disconnected from the handheld computing device;
responsive to determining that the processor has been disconnected from the handheld computing device, encrypting at least one of: a document, a folder, and a directory with a key of the PK certificate of the processor maintained on the handheld computing device.

14. The one or more non-transitory computer-readable media of claim 13, wherein the selected first cryptography option is an option to encrypt or decrypt the at least one of: a document, a folder, a directory, and an e-mail, the implementing including encrypting or decrypting the at least one document, folder, directory, and e-mail.

15. The one or more non-transitory computer-readable media of claim 13, wherein the selected first cryptography option is an option to digitally sign a document or verify a digitally signed document, the implementing including digitally signing the document with a private key on the apparatus or verifying the digitally signed document from an external source.

16. The one or more non-transitory computer-readable media of claim 13, wherein the selected first cryptography option is an option to enable a secure connection using a private key on the apparatus using one of an SSL connection or through a virtual private network, the implementing including validating the SSL connection or connecting to the virtual private network.

17. The one or more non-transitory computer-readable media of claim 13, the computer executable instructions, that when executed by the at least one processor, further cause the processor to perform transmitting a PK certificate of a recipient, wherein the selected first cryptography option is an option to encrypt an e-mail to the recipient, the implementing including encrypting the e-mail with a key of the PK certificate of the recipient.

* * * * *